US012568119B2

(12) United States Patent
Kamath et al.

(10) Patent No.: US 12,568,119 B2
(45) Date of Patent: Mar. 3, 2026

(54) METHOD AND ELECTRONIC DEVICE FOR HANDLING SECURE VIRTUAL EVENT IN VIRTUAL ENVIRONMENT

(71) Applicant: Samsung Electronics Co., Ltd., Suwon-si (KR)

(72) Inventors: Vishwanath Pethri Kamath, Bengaluru (IN); Madhushree Suresha Gowda, Bengaluru (IN); Vaibhav Ittan, Bengaluru (IN); Sushant Kumar, Bengaluru (IN); Jayantha Gowda Sarapanahalli, Bengaluru (IN); Sudhansu Ranjan Acharya, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 18/342,500

(22) Filed: Jun. 27, 2023

(65) Prior Publication Data

US 2023/0421611 A1     Dec. 28, 2023

(30) Foreign Application Priority Data

Jun. 27, 2022     (IN) .............................. 202241036797

(51) Int. Cl.
H04L 9/40     (2022.01)
H04L 67/131     (2022.01)
(52) U.S. Cl.
CPC ............ H04L 63/20 (2013.01); H04L 67/131 (2022.05)
(58) Field of Classification Search
CPC ...................................................... H04L 63/20
See application file for complete search history.

(56) References Cited

U.S. PATENT DOCUMENTS

| | | | | |
|---|---|---|---|---|
| 7,249,139 | B2 * | 7/2007 | Chuah ................... | G06F 16/289 |
| | | | | 707/999.102 |
| 8,516,396 | B2 * | 8/2013 | Bromenshenkel ..... | G06Q 30/06 |
| | | | | 715/848 |
| 10,943,397 | B2 * | 3/2021 | de los Reyes ........ | H04L 12/282 |
| 11,122,424 | B1 * | 9/2021 | Branscomb ......... | H04W 12/033 |
| 11,474,596 | B1 * | 10/2022 | Aloisio .............. | G06F 11/3093 |
| 2009/0282472 | A1 | 11/2009 | Hamilton, II et al. | |
| 2009/0303984 | A1 | 12/2009 | Clark et al. | |

(Continued)

FOREIGN PATENT DOCUMENTS

EP          3 699 736          8/2020

OTHER PUBLICATIONS

Examination report dated May 1, 2025 in Indian Patent Application No. 202241036797 and English-language translation.

*Primary Examiner* — Viral S Lakhia
(74) *Attorney, Agent, or Firm* — Nixon & Vanderhye, P.C.

(57)          ABSTRACT

An example method for handling a secure virtual event in a virtual environment by an electronic device includes receiving at least one input from a first user avatar to create at least one virtual event within the virtual environment. The method further includes identifying at least one second user avatar for participating the at least one created virtual event based on the received input from the first user avatar and a nature of the virtual event and determining at least one security policy corresponding to at least one action associated with the at least one second user avatar and at least one parameter within the at least one created virtual event.

18 Claims, 21 Drawing Sheets

140d

(56)                References Cited

U.S. PATENT DOCUMENTS

| | | | |
|---|---|---|---|
| 2010/0081508 A1 | 4/2010 | Bhogal et al. | |
| 2012/0131478 A1 | 5/2012 | Maor et al. | |
| 2017/0323489 A1* | 11/2017 | Clement ................. | A63F 13/52 |
| 2018/0159841 A1 | 6/2018 | Toff | |
| 2021/0166488 A1* | 6/2021 | De Los Reyes ...... | G06T 19/006 |
| 2021/0304515 A1* | 9/2021 | Hutten ................... | G06T 13/40 |
| 2022/0070411 A1* | 3/2022 | Li .......................... | H04N 7/157 |
| 2023/0376625 A1* | 11/2023 | Soryal ................... | G06V 20/20 |
| 2024/0022561 A1* | 1/2024 | Ingram .................. | H04L 63/08 |

* cited by examiner

FIG. 3
(CONVENTIONAL ART)
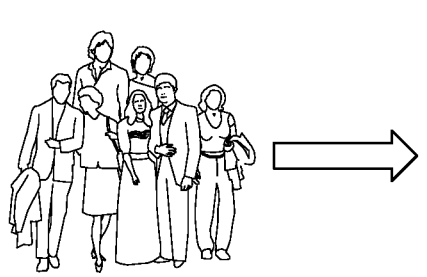
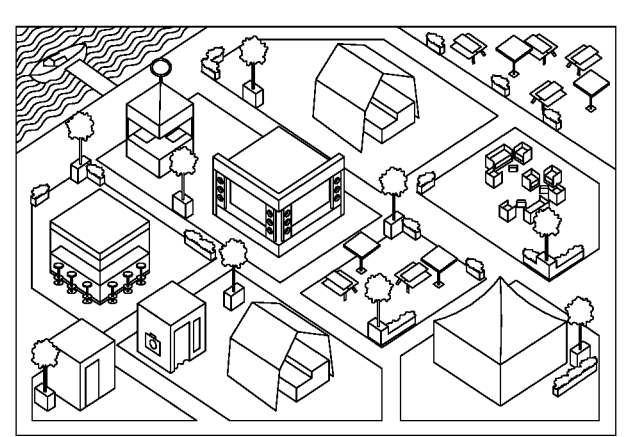
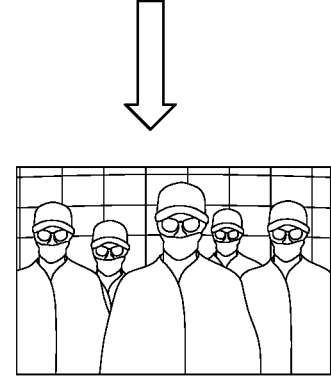

FIG. 4

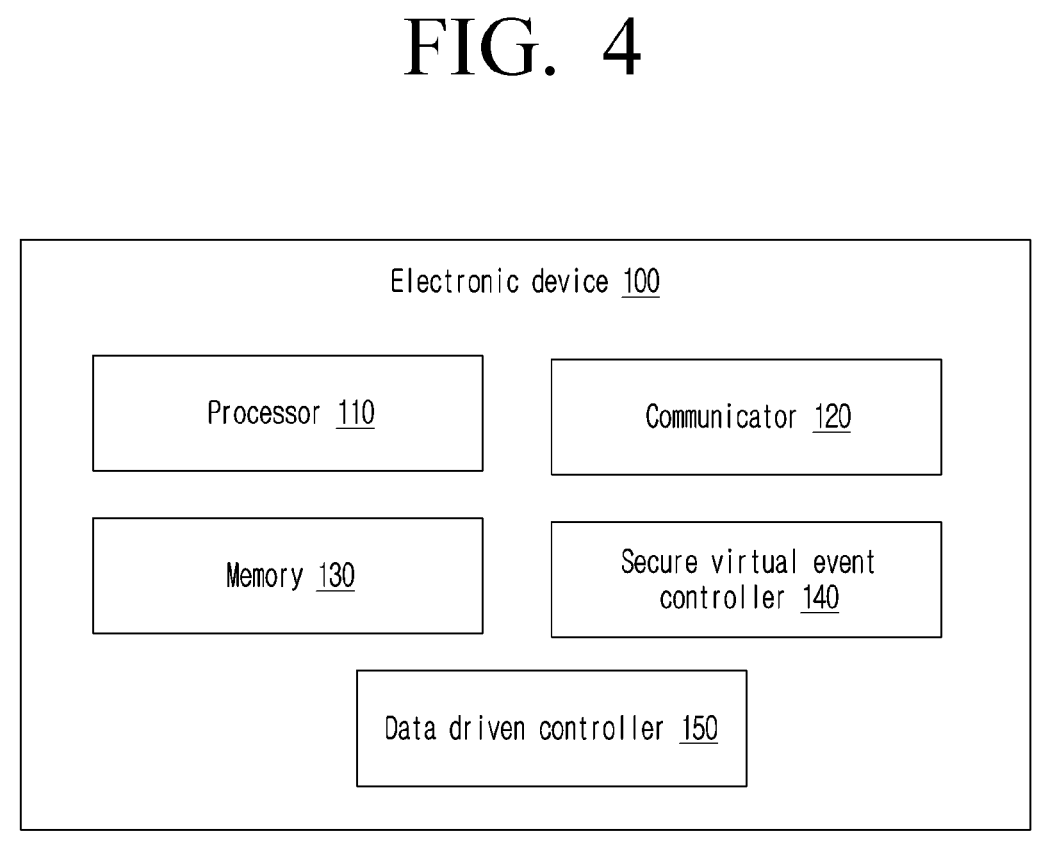

Electronic device 100

Processor 110

Communicator 120

Memory 130

Secure virtual event controller 140

Data driven controller 150

FIG. 5

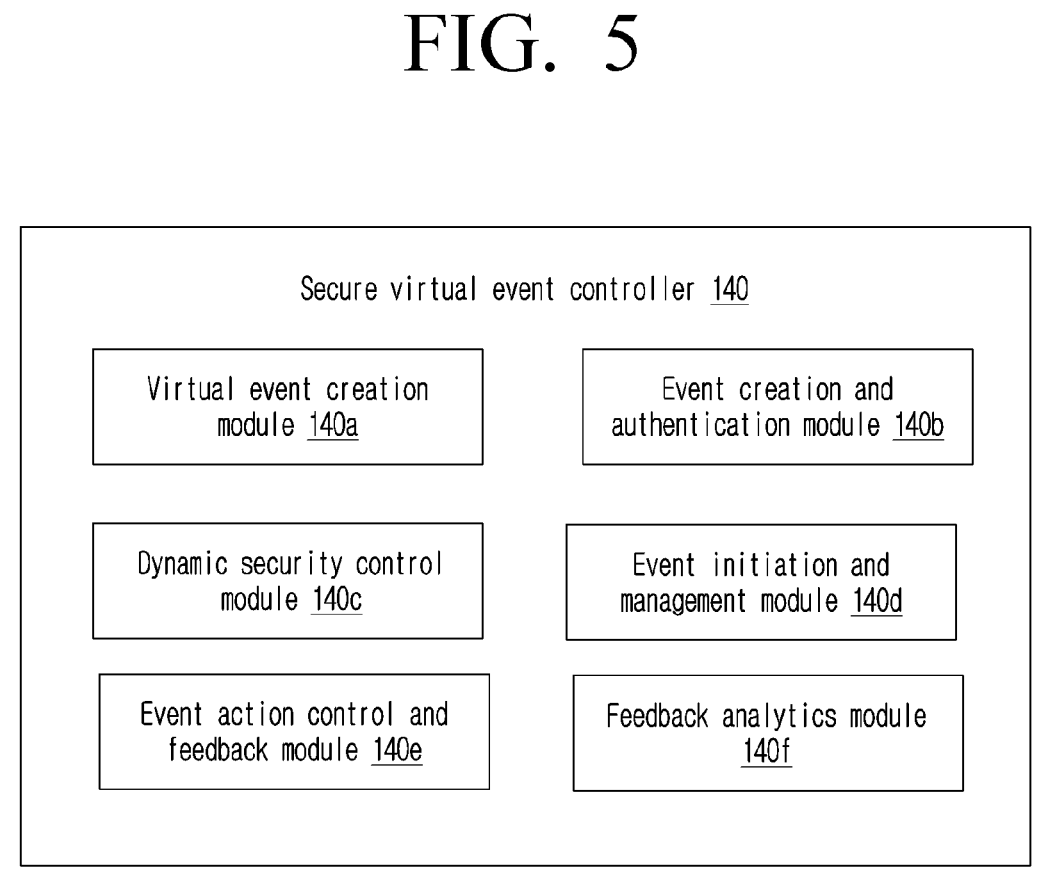

Secure virtual event controller 140

Virtual event creation module 140a

Event creation and authentication module 140b

Dynamic security control module 140c

Event initiation and management module 140d

Event action control and feedback module 140e

Feedback analytics module 140f

FIG. 11

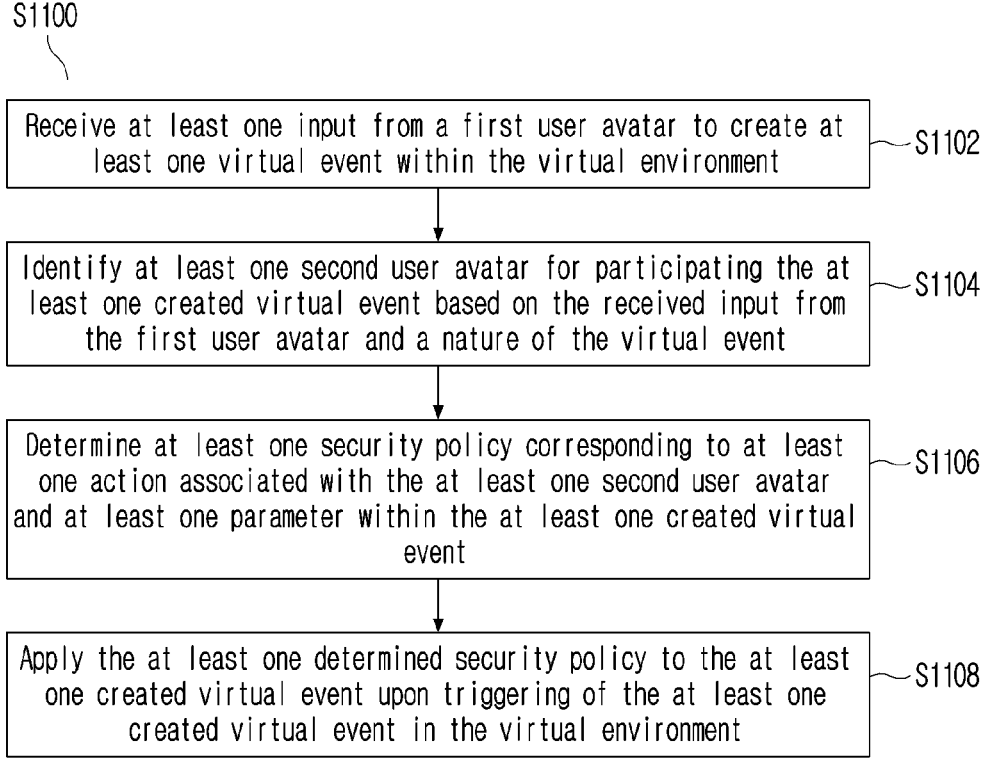

S1100

Receive at least one input from a first user avatar to create at least one virtual event within the virtual environment ⌐S1102

Identify at least one second user avatar for participating the at least one created virtual event based on the received input from the first user avatar and a nature of the virtual event ⌐S1104

Determine at least one security policy corresponding to at least one action associated with the at least one second user avatar and at least one parameter within the at least one created virtual event ⌐S1106

Apply the at least one determined security policy to the at least one created virtual event upon triggering of the at least one created virtual event in the virtual environment ⌐S1108

FIG. 21

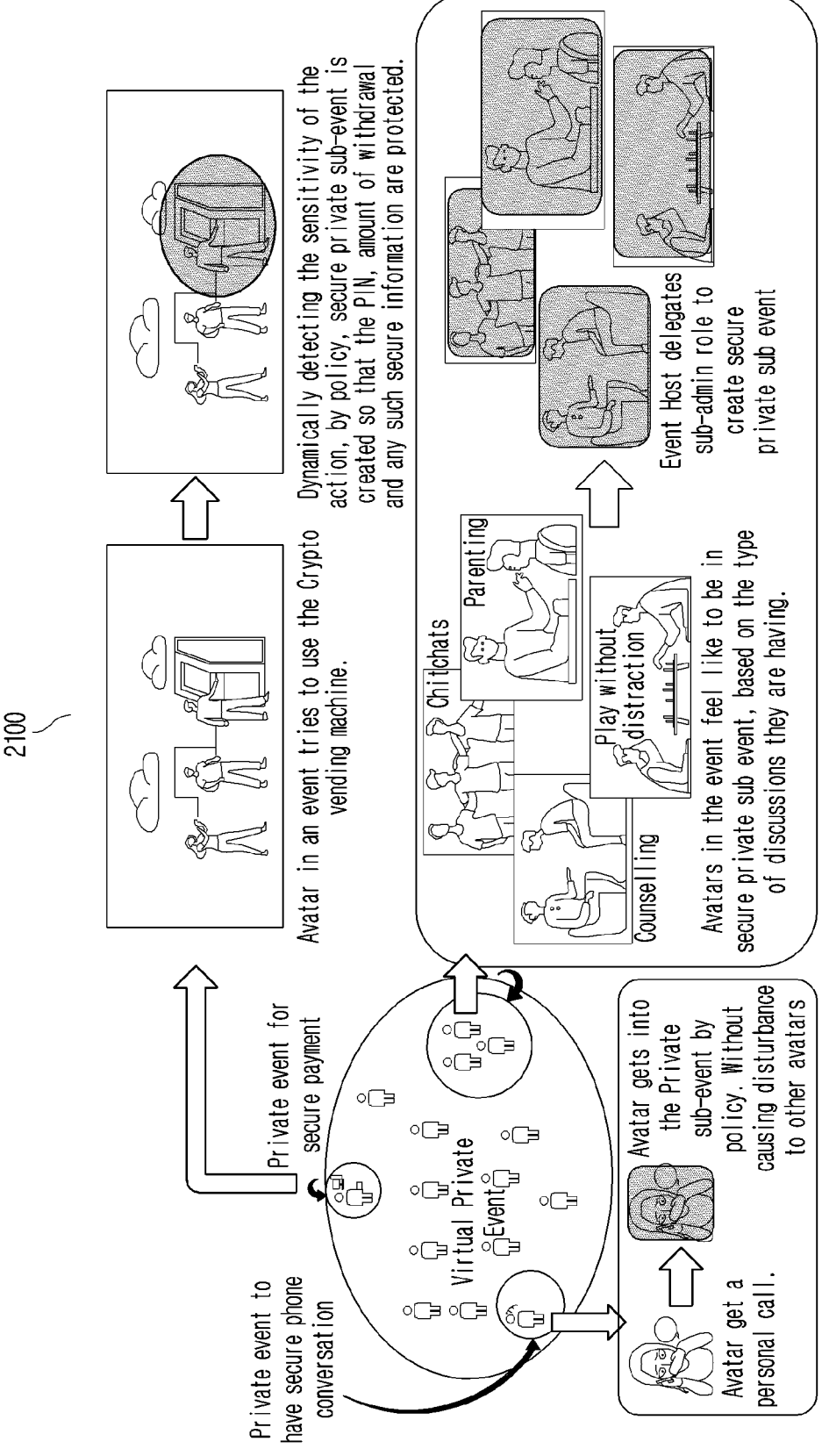

2100

Private event to have secure phone conversation

Private event for secure payment

Avatar in an event tries to use the Crypto vending machine.

Dynamically detecting the sensitivity of the action, by policy, secure private sub-event is created so that the PIN, amount of withdrawal and any such secure information are protected.

Event Host delegates sub-admin role to create secure private sub event

Parenting

Chitchats

Play without distraction

Counselling

Avatars in the event feel like to be in secure private sub event, based on the type of discussions they are having.

Virtual Private Event

Avatar gets into the Private sub-event by policy. Without causing disturbance to other avatars Avatar get a personal call.

METHOD AND ELECTRONIC DEVICE FOR HANDLING SECURE VIRTUAL EVENT IN VIRTUAL ENVIRONMENT

CROSS-REFERENCE TO RELATED APPLICATIONS

This application claims priority under 35 U.S.C. § 119 to Indian Patent Application No. 202241036797, filed Jun. 27, 2022, in the Indian Patent Office. The contents of this application are incorporated herein in their entirety.

BACKGROUND

Field

The disclosure relates to an immersive system and, for example, to methods and systems for handling a secure virtual event in a virtual environment.

Description of Related Art

Events (e.g., birthday party, virtual match, a wedding or the like) in virtual environments provide much more engagement, interactions, entertainment and ease of use to attend, without a need of being present at a physical venue. But with this ease of access, a user will be exposed to sharing personal information, privacy of users' virtual actions, communications with other virtual avatars, business communications, or any unforeseen experiences in the virtual events. Every action or incident involving the user avatar in the virtual event will affect a user's virtual avatar as well as real-world personality, be it in a positive way or a negative way. This is a major privacy and security aspect that need to be addressed. Some example of such privacy incidents in a virtual environment are explained in FIGS. 1, 2, and 3.

FIGS. 1, 2, and 3 are example illustrations (S100, S200, and S300) in which an electronic device handles various secure virtual events in the virtual environment, according to conventional art.

As shown in FIG. 1, in a party event, multiple spaces included to cater to the different age group of avatars attending the party event. Consider a scenario in which a couple of avatars enter into a photo booth and spends private moments posing for selfies thinking that no one enters the photo booth. Meanwhile a child avatar enters into the photography booth without any consent and the couple is already taking photos in the booth. Due to the child's surprise, the child is in shock to see the unexpected and runs out of the photo booth. This causes the privacy breach of the couple of avatars in the photo booth, as private moments of the couple did not remain private.

Further, the couple gets shocked and feels miserable due to the unexpected event, since the private moments leaked and were noticed by a third person. This privacy/security breach creates a sense of insecurity in the virtual as well as the real world life of the couple thereafter.

As shown in FIG. 2, a random person tries to interact with a child (i.e., Johnny), when the child is in a networking space. The child tries to avoid the random person by moving away. But the random person avatar still follows the Johnny. Johnny is now in potential risk. Johnny might not know how to escape or Save Our Souls (SOS) and this might cause damage to the virtual avatar personality and cause a real world long term miserable experience.

As shown in FIG. 3, Norman requests a host to conduct a private sub-event in a birthday event. The host allows Norman to host a sub-event with certain limitations (e.g., 15 minutes sub-event, One-time event, Maximum 5 avatars or the like). Norman allows few attendees from the main event and starts some activity that looks suspicious. It looks like a group of hackers with illegal activities. During the virtual event, virtual avatars observe inconsistencies in the sub-event and have a feeling of system hack, causing virtual personality degradation and issues in the real world too.

Thus, it would be desirable to address the above mentioned disadvantages or other shortcomings or at least provide a useful alternative.

SUMMARY

The example embodiments herein provide a method and an electronic device for handling a secure virtual event in a virtual environment (e.g., metaverse environment, immersive environment on-line virtual environment, or the like).

The example embodiments herein may receive inputs from a first user to create at least one virtual event within the metaverse environment.

The example embodiments herein may automatically identify one or more user avatars for participating in the at least one virtual event based on the received input from the user and nature of the virtual event.

The example embodiments may dynamically determine one or more security controls/policies for the virtual event and apply, in response to the initiation of the at least one virtual event, the determined security controls to the at least one virtual event within the metaverse environment.

Accordingly, the example embodiments provide a method for handling a secure virtual event in a virtual environment. The method may include receiving, by an electronic device, at least one input from a first user avatar to create at least one virtual event within the virtual environment; identifying, by the electronic device, at least one second user avatar for participating the at least one created virtual event based on the received input from the first user avatar and a nature of the virtual event; and determining, by the electronic device, at least one security policy corresponding to at least one action associated with the at least one second user avatar and at least one parameter within the at least one created virtual event.

In an example embodiment, the method may further include applying, by the electronic device, the at least one determined security policy to the at least one created virtual event upon triggering of the at least one created virtual event in the virtual environment.

In an example embodiment, the method may further include monitoring, by the electronic device, the at least one security policy to generate at least one feedback over a period of time using a data driven model and modifying, by the electronic device, the at least one security policy based on the at least one feedback.

In an example embodiment, the method may further include determining, by the electronic device, a policy breach corresponding to the at least one created virtual event in the virtual environment; analyzing, by the electronic device, the policy breach; providing, by the electronic device, a suggestion to update (e.g., optimize) the at least one security policy; and applying, by the electronic device, the at least one updated security policy to the at least one created virtual event upon triggering of the at least one created virtual event in the virtual environment.

In an example embodiment, the method may further include determining, by the electronic device, a policy breach corresponding to the at least one created virtual event in the virtual environment and analyzing, by the electronic device, the policy breach to block and report the policy breach in the virtual environment.

In an example embodiment, information associated with the policy breach may include a profile history of the at least one second user avatar, a past event hosted by the at least one second user avatar, a past event attended by at least one second user avatar, an incident reported on profiles in the past events, recurrence of security event reports, a profile history of the first user avatar, a past event hosted by the first user avatar, a past event attended by the first user avatar, incidents reported on the profile in the past events, recurrence of the security event report, behavioral patterns and sensitive information regarding a privacy and security of virtual space included in the virtual event, event surveillance data log, event specific incidents observed based on the event type and spaces, historical data on the virtual space and incidents reported and possible security breach data points.

In an example embodiment, the method may further include assigning, by the electronic device, an admin privilege to the at least one second user avatar for creating at least one sub-virtual event in the virtual environment and performing, by the electronic device, at least one of: allowing the at least one sub-virtual event in response to determining that a privacy of the user action in the at least one sub-virtual event is met in the virtual environment, or denying the at least one sub-virtual event in response to determining that the privacy of the user action in the at least one sub-virtual event is not met in the virtual environment.

In an example embodiment, the at least one security policy for the at least one created virtual event may be generated by correlating security activity patterns, past behaviours associated with the at least one second user avatar, user profiles associated with the at least one second user avatar, past behaviours associated with the first user avatar, user profiles associated with the first user avatar, information associated with the at least one virtual event and the virtual location.

In an example embodiment, determining, by the electronic device, the at least one security policy may include acquiring at least one of security breach reports and measures data, details of the virtual event, profiles associated with the first user avatar and profiles associated with the at least one second user avatar, processing at least one of the security breach reports and measures data, the details of the virtual event, the profiles associated with the first user avatar or the profiles associated with the at least one second user avatar using a data driven model, and determining, by the electronic device, the at least one security policy in response to processing.

In an example embodiment, the at least one parameter may include a virtual location, event information, space restriction, and time related information, wherein at least one input comprises at least one of virtual event information, virtual location information, or a list including the at least one second user avatar.

In an example embodiment, the at least one virtual event may be created by determining information associated with the first user avatar and information associated with the at least one second user avatar, wherein the information includes at least one privacy, age group, a location and time, extracting a nature of the virtual event, and creating the at least one virtual event based on the information associated with the first user avatar and information associated with the at least one second user avatar and the nature of the virtual event.

In an example embodiment, at least one second user avatar for participating the at least one created virtual may be identified by authorizing and sending an event invite message to the at least one second user avatar from the first user avatar, receiving an event acceptance message from the at least one second user avatar to the first user avatar, and initiating the event with controllable privacy settings with the at least one second avatar based on the event acceptance message.

Accordingly, the example embodiments herein may provide an electronic device for handling a secure virtual event in a virtual environment. The electronic device may include a secure virtual event controller coupled with a processor and a memory. The secure virtual event controller may be configured to receive at least one input from a first user avatar to create at least one virtual event within the virtual environment; identify at least one second user avatar for participating the at least one created virtual event based on the received input from the first user avatar and a nature of the virtual event; and determine at least one security policy corresponding to at least one action associated with the at least one second user avatar and at least one parameter within the at least one created virtual event.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the scope thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The above and/or other aspects of the disclosure will be more apparent by describing certain embodiments of the disclosure with reference to the accompanying drawings, in which:

FIGS. 1, 2, and 3 are example illustrations in which an electronic device handles various secure virtual events in a virtual environment according to conventional art;

FIG. 4 shows various hardware components of an example electronic device according to various embodiments;

FIG. 5 shows various hardware components of an example secure virtual event controller included in the electronic device, according to various embodiments;

FIG. 11 is a flow chart illustrating an example method for handling a secure virtual event in the virtual environment according to various embodiments;

FIG. 21 is an example illustration in which an example electronic device handles a secure virtual event in the virtual environment during a secure private sub-event within an event scenario according to various embodiments.

DETAILED DESCRIPTION

Figure 1:
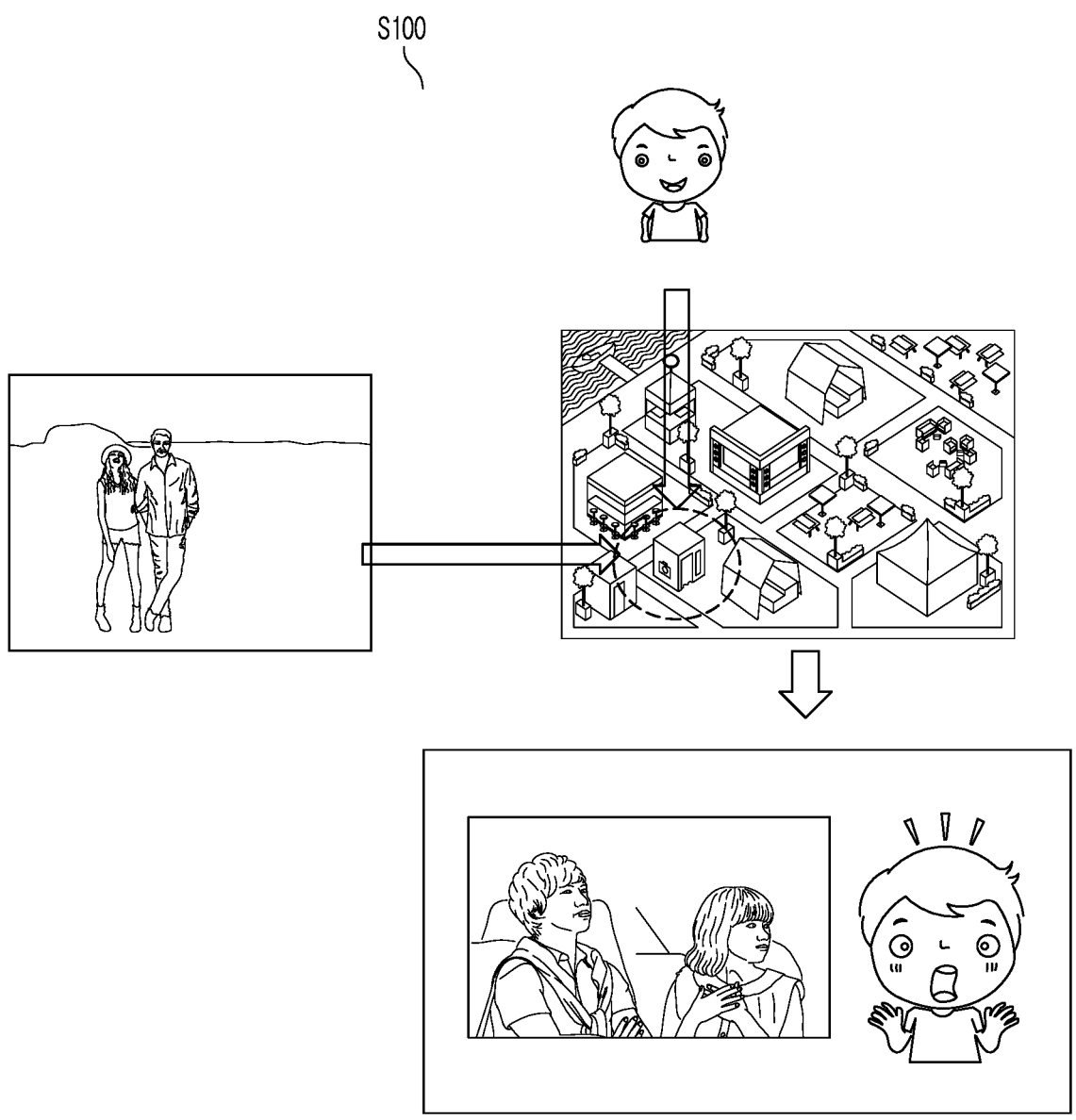
Figure 2:
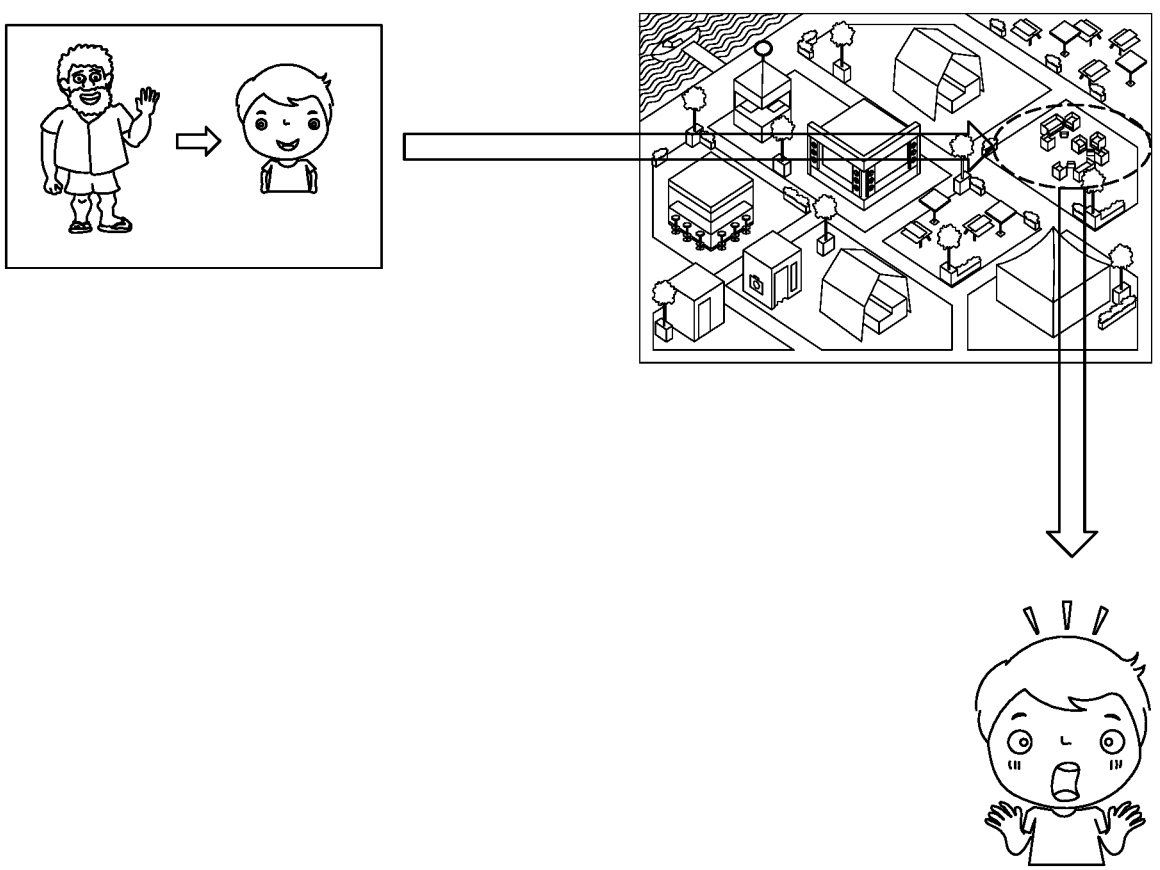

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve a method for handling a secure virtual event in a virtual environment. The method includes receiving, by an electronic device, at least one input from a first user avatar to create at least one virtual event within the virtual environment. Further, the method includes identifying, by the electronic device, at least one second user avatar for participating in the at least one created virtual event based on the received input from the first user avatar and a nature of the virtual event. Further, the method includes determining, by the electronic device, at least one security policy corresponding to at least one action associated with the at least one second user avatar and at least one parameter within the at least one created virtual event.

The method can be used to provide security and control in the virtual event, and dynamic determination of policies and controlling of the environment can make the virtual environment secure. The method can be used to ensure user privacy and security in virtual environment events, and, in-turn, ensuring that the virtual, as well as real-world, user personality remain intact.

The method supports an auto-block and auto-report of virtual environment security incidents to an authorized person or entity. The method uses a feedback mechanism to improve dynamic security policies.

Referring now to the drawings, and more particularly to FIGS. 4 through 21, where similar reference characters denote corresponding features consistently throughout the figures, there are shown example embodiments.

FIG. 4 shows various hardware components of the electronic device (100) according to various embodiments. The electronic device (100) can be, for example, but is not limited to, a laptop, a desktop computer, a notebook, a vehicle to everything (V2X) device, a smartphone, a tablet, an internet of things (IoT) device, an immersive device, a virtual reality device, a foldable device or the like. In an embodiment, the electronic device (100) includes a processor (110) (including, e.g., processing circuitry), a communicator (120) (including, e.g., communication circuitry), a memory (130), a secure virtual event controller (140), and a data driven controller (150). The processor (110) is coupled with the communicator (120), the memory (130), the secure virtual event controller (140), and the data driven controller (150).

The secure virtual event controller (140) receives at least one input from a first user avatar to create at least one virtual event within the virtual environment. The virtual event can be, for example, but is not limited to, a virtual public event, a virtual conference event, a virtual concert event, or any virtual private event. The input can be, for example, but is not limited to, a voice input, a gesture input, a touch input or the like. The input includes at least one of virtual event information, virtual location information, and a list including at least one second user avatar information.

Further, the secure virtual event controller (140) identifies at least one second user avatar for participating in the at least one created virtual event based on the received input from the first user avatar and a nature of the virtual event. Further, the secure virtual event controller (140) determines at least one security policy corresponding to at least one action associated with the at least one second user avatar and at least one parameter within the at least one created virtual event. The at least one parameter may include, for example, a virtual location, event information, space restriction, and/or time-related information.

In an embodiment, the at least one security policy for the at least one created virtual event is generated by correlating security activity patterns, past behaviours associated with the at least one second user avatar, user profiles associated with the at least one second user avatar, past behaviours associated with the first user avatar, user profiles associated with the first user avatar, information associated with the at least one virtual event, and/or the virtual location.

The at least one virtual event is created by determining information associated with the first user avatar and information associated with the at least one second user avatar, where the information includes at least one of privacy, age group, a location, or time, extracting a nature of the virtual event, and creating the at least one virtual event based on the information associated with the first user avatar and information associated with the at least one second user avatar and the nature of the virtual event.

The at least one second user avatar for participating in the at least one created virtual event is identified by authorizing and sending an event invite message to the at least one second user avatar from the first user avatar, receiving an event acceptance message from the at least one second user avatar to the first user avatar, and initiating the event with controllable privacy settings with the at least one second avatar based on the event acceptance message.

In an embodiment, the secure virtual event controller (140) acquires at least one of security breach reports and measures data, details of the virtual event, profiles associated with the first user avatar, and/or profiles associated with the at least one second user avatar. Further, the secure virtual event controller (140) processes at least one of the security breach reports and measures data, the details of the virtual event, the profiles associated with the first user avatar and/or the profiles associated with the at least one second user avatar using a data driven model (e.g., ML model, AI model or the like). Further, the secure virtual event controller (140) determines the at least one security policy based on the processing.

Further, the secure virtual event controller (140) applies the at least one determined security policy to the at least one created virtual event upon triggering of the at least one created virtual event in the virtual environment.

Further, the secure virtual event controller (140) monitors the at least one security policy to generate at least one feedback over a period of time using the data driven model. Further, the secure virtual event controller (140) modifies the at least one security policy based on the at least one feedback.

Further, the secure virtual event controller (140) determines a policy breach corresponding to the at least one created virtual event in the virtual environment. The secure virtual event controller (140) analyzes the policy breach and provides a suggestion to optimize the at least one security policy. Further, the secure virtual event controller (140) applies the at least one optimized security policy to the at least one created virtual event upon triggering of the at least one created virtual event in the virtual environment.

Further, the secure virtual event controller (140) determines a policy breach corresponding to the at least one created virtual event in the virtual environment, and analyzes the policy breach to block and report the policy breach in the virtual environment.

In an embodiment, information associated with the policy breach includes the profile history of the at least one second user avatar, a past event hosted by the at least one second user avatar, a past event attended by at least one second user avatar, an incident reported on profiles in the past events, recurrence of security event reports, a profile history of the first user avatar, a past event hosted by the first user avatar, a past event attended by the first user avatar, incidents reported on the profile in the past events, recurrence of the security event report, behavioural patterns and sensitive information regarding a privacy and security of virtual space included in the virtual event, an event surveillance data log, event specific incidents observed based on the event type and spaces, historical data on the virtual space and incidents reported, and/or possible security breach data points.

Further, the secure virtual event controller (140) assigns an admin (administrator) privilege to the at least one second user avatar for creating at least one sub-virtual event in the virtual environment. In an embodiment, the secure virtual event controller (140) allows the at least one sub-virtual event in response to determining that a privacy of the user action in the at least one sub-virtual event is met in the virtual environment. In an embodiment, the secure virtual event controller (140) denies at least one sub-virtual event in response to determining that the privacy of the user action in the at least one sub-virtual event is not met in the virtual environment.

The secure virtual event controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by software and/or firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted as the memory (130) being non-movable. In certain examples, a non-transitory storage medium may store data that can, over time, change (e.g., in Random Access Memory (RAM) or cache).

Further, at least one of the pluralities of modules/controller may be implemented through an AI model using a data driven controller (150). The data driven controller (150) may, for example, be a ML model based controller and AI model based controller. A function associated with the AI model may be performed through the non-volatile memory, the volatile memory, and the processor (110). The processor (110) may include one or a plurality of processors. At this time, one or a plurality of processors may, for example, be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning refers, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may include of a plurality of neural network layers. Each layer has a plurality of weight values, and performs a layer operation through calculation of a previous layer and an operation of a plurality of weights. Examples of neural networks include, but are not limited to, convolutional neural networks (CNNs), deep neural networks (DNNs), recurrent neural networks (RNNs), restricted Boltzmann Machines (RBMs), deep belief networks (DBNs), bidirectional recurrent deep neural networks (BRDNNs), generative adversarial networks (GANs), and deep Q-networks.

The learning algorithm may, for example, be a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4 shows various hardware components of the electronic device (100), it should be understood that other embodiments are not limited in this respect. In various embodiments, the electronic device (100) may include fewer or more components. Further, the labels or names of the components are used only for illustrative purpose and do not limit the scope of the disclosure. One or more components can be combined together to perform same or substantially similar function in the electronic device (100).

FIG. 5 shows various hardware components of the secure virtual event controller (140) included in the electronic device (100) according to various embodiments. In an embodiment, the secure virtual event controller (140) includes a virtual event creation module (140a), an event creation and authentication module (140b), a dynamic security control module (140c), an event initiation and management module (140d), an event action control and feedback module (140e), and a feedback analytics module (140f).

The virtual event creation module (140a) receives inputs such as event information, virtual location information, invitees list, etc., The event creation and authentication module (140b) performs identification of virtual avatars, identification of a nature of the virtual event, and/or sharing of invites based in the received input. In an embodiment, based on the inputs, the event creation and authentication module (140b) identifies the avatars, extracts the nature of the event, extracts information on privacy, age group, virtual environment and areas that qualify for the event based on the previous selection and nature of the event and attendee information.

The dynamic security control module (140c) determines the security controls, related actions associated with the second user avatars, virtual location and event information, space restriction etc. In an embodiment, based on event creator module information, the dynamic security control module (140c) sets policies and feedback analytics to improve policy definitions.

The event initiation and management module (140d) initiates the event, applies security controls, and administers the event for any actions. The event action control and feedback module (140e) enforces the policies by actions in response to the virtual events, by determined security controls and provides dynamic control over the event by detecting, applying appropriate controls, and reporting incidents for maintaining a record to improve current and future event policy definitions. The feedback analytics module (140f) provides feedback by capturing security incidents for policy improvements.

Although FIG. 5 shows various hardware components of the secure virtual event controller (140), it is to be understood that other embodiments are not limited thereto. In various embodiments, the secure virtual event controller (140) may include fewer or more components. Further, the labels or names of the components are used only for illustrative purpose and do not limit the scope of the disclosure. One or more components can be combined together to perform same or substantially similar function in the secure virtual event controller (140).

Figure 6:
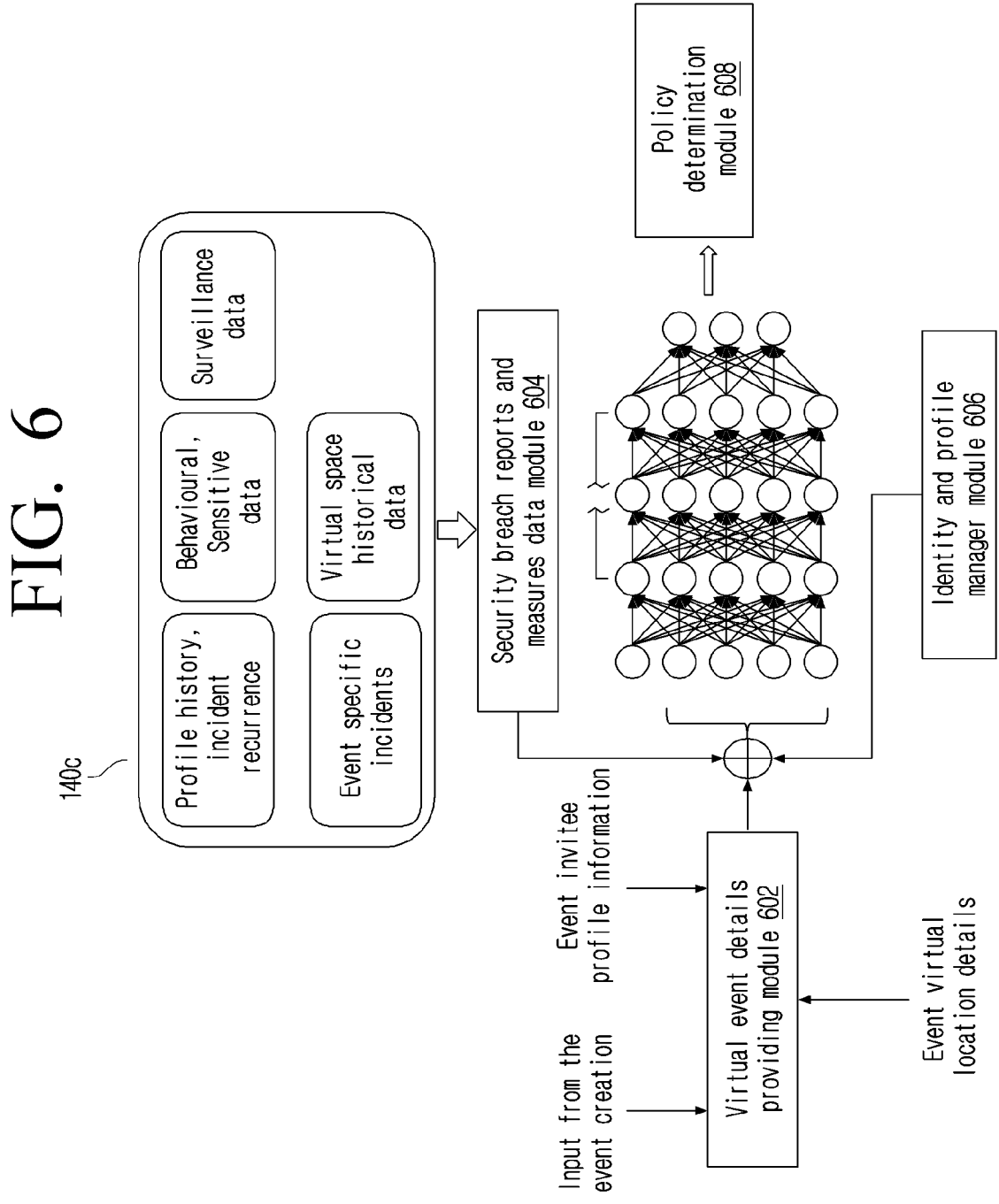
FIG. 6 and FIG. 7 show various hardware components of an example dynamic security control module included in the secure virtual event controller for performing a policy action and a control action according to various embodiments.
Figure 7:
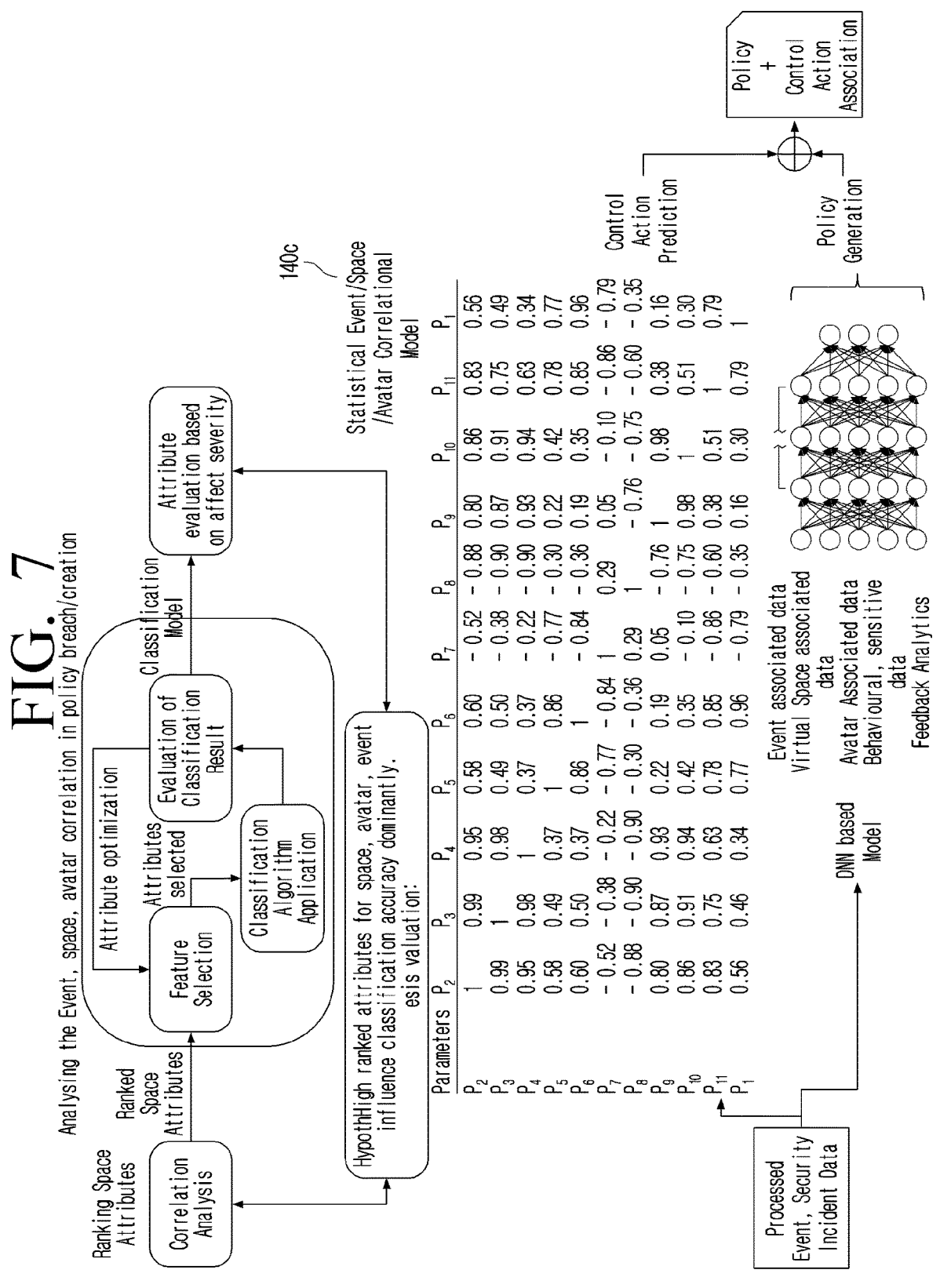

FIG. 6 and FIG. 7 show various hardware components of the dynamic security control module (140c) included in the secure virtual event controller (140) for performing the policy action and the control action according to various embodiments. In an embodiment, the dynamic security control module (140c) includes a virtual event detail providing module (602), a security breach reports and measures data module (604), an identity and profile manager module (606), and a policy determination module (608).

The virtual event detail providing module (602) receives data from different sources such as input from the event host, event schedule, event information, virtual space details, and event invitees. In an example, the input from the event creation is shown in the Table 1.

TABLE 1

| Input From the event Creation | |
| --- | --- |
| Parameters | Details |
| hostID | 0000-0000-0001 |
| role | admin |
| eventInfo | {name:birthdayParty, |
| | type:private, |
| | scope: inviteesOnly, |
| | securityPolicyApplied:true} |
| Event Schedule | {date: 20-Jun-2022, Time: 1630hrsGMT, |
| | duration: 240 Minutes} |

Table 2 shows the event and virtual location details, for example.

TABLE 2

| Event and Virtual Location Details | |
| --- | --- |
| Parameters | Details |
| eventInfo | {name:birthdayParty, |
| | type:private, |
| | scope: inviteesOnly, |
| | securityPolicyApplied:true} |
| virtualLocation | { |
| | locID:virt_loc_0001, |
| | areasIncluded: [openhall, beachZone, |
| | barZone, kidsZone, playZone, noKidsZone, |
| | foodandDrinksZone], |
| | controlledZones:[beachZone, barZone, |
| | noKidsZone] |
| | } |

Table 3 shows the event and virtual location details, for example.

TABLE 3

Event Invitee Profile Information

| Parameters | Details |
|---|---|
| eventInvitees | { |
| | invitee1: {name:John, age: 18, gender: male, relationship: friend}, |
| | invitee2: {name:Lila, age: 10, gender: female, relationship: friend}, |
| | invitee3:{name:Dexter, age: 15, gender: male, relationship: cousin}, |
| | ....... |
| | } |

Tables 4A, 4B, and 4C show example policy generation.

TABLE 4A

| securityPolicy | 0000-0000-0000-0001 |
|---|---|
| virtualLocationID | virt_loc_0001 |
| areaName | beachZone |
| areaID | 0000-0012 |
| controlledZone | TRUE |
| ageRestriction | 18 |
| adultAccompany | TRUE |

TABLE 4B

| securityPolicy | 0000-0000-0000-0003 |
|---|---|
| virtualLocationID | virt_loc_0001 |
| areaName | barZone |
| areaID | 0000-0017 |
| controlledZone | TRUE |
| ageRestriction | 18 |
| subEventCreation | Allowed |
| subEventAuth | Admin |

TABLE 4C

| securityPolicy | 0000-0000-0000-0002 |
|---|---|
| virtualLocationID | virt_loc_0001 |
| areaName | noKidZone |
| areaID | 0000-0015 |
| controlledZone | TRUE |
| ageRestriction | 21 |
| subEventCreation | Allowed |
| subEventAuth | Admin |

Based on the policy, the possible action may be, for example, (Action 1: Identify, Gather, Preserve breach evidence, Action 2: On Breach Identify and restrict access to/detain suspects, Action 3: Record and report to stakeholders precisely, and Action 4: Protect the NFTs).

The security breach reports and measures data module (604) gathers the data from multi modal sources such as host and invitee profile history, past events hosted or attended, incidents reported on the profiles in past events, recurrence of the security event reports, behavioural patterns and sensitive information regarding the privacy and security of the virtual spaces included in the event, event surveillance data log including data points related to spaces and related activities and observed security and privacy incidents, event specific incidents observed based on the event type and spaces included, historical data on the virtual space and incidents reported and possible security breach data points, and/or feedback analytics data utilized to improve the existing policies and for new scenarios observed could result in new policies.

The identity and profile manager module (606) gathers profile data associated with host and attendee profiles.

The data points received from the virtual event detail providing module (602), the security breach reports and measures data module (604), and the identity and profile manager module (606) are processed and prepared for modelling for probable security breach identification.

The policy determination module (608) determines the policies based on deep neural modelling for breach identification and severity classification based on data such as data associated with avatar profiles, data associated with event type and virtual spaces, user profile behavioural patterns, sensitive information such as space/profile security and privacy, and/or feedback analytics from the event. A correlational model predicts the action control measures for different virtual spaces, events, and avatars. The policies identified and action control predictions prepared are then associated based on event, virtual space, and profiles.

Although FIG. 6 and FIG. 7 show various hardware components of the dynamic security control module (140c), it should be understood that other embodiments are not limited thereto. In various embodiments, the dynamic security control module (140c) may include fewer or more components. Further, the labels or names of the components are used only for illustrative purpose and does not limit the scope of the disclosure. One or more components can be combined together to perform same or substantially similar function in the dynamic security control module (140c).

Figure 8:
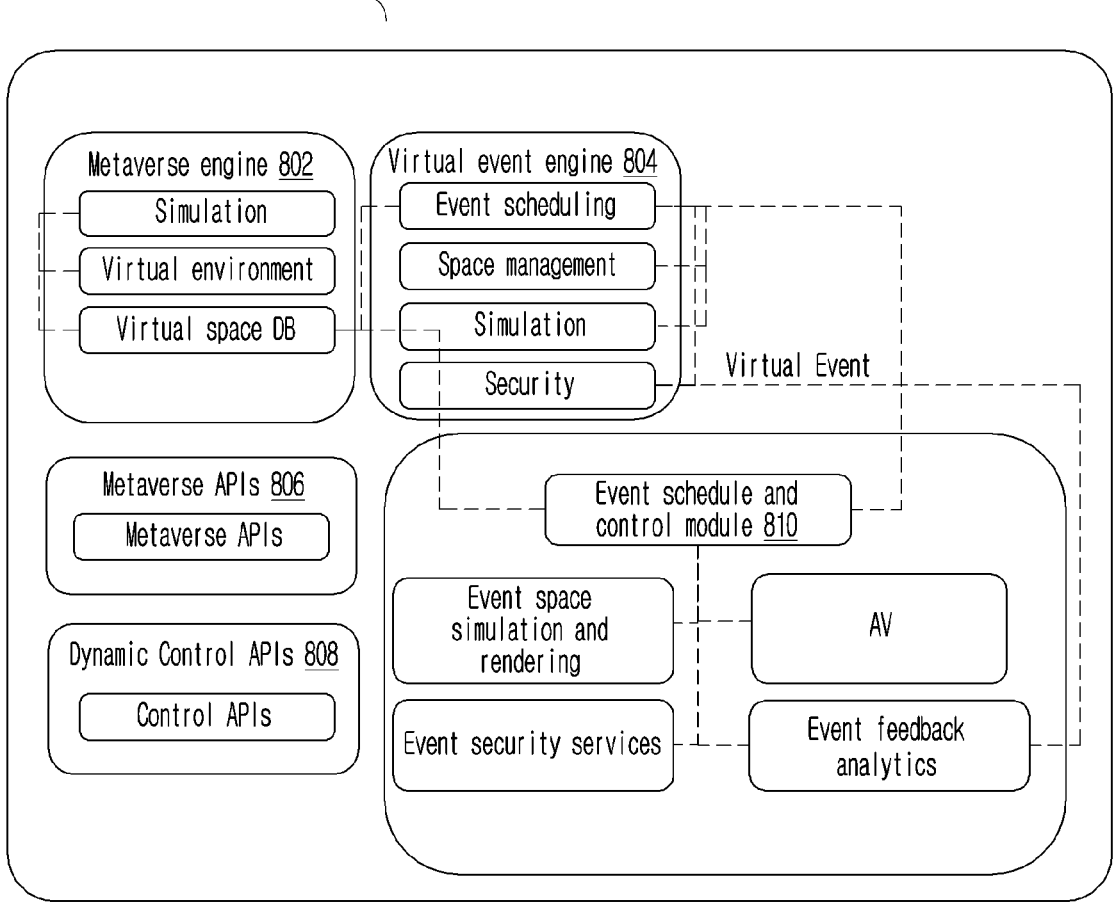
FIG. 8 shows various hardware components of an example event initiation and management module included in the secure virtual event controller according to various embodiments.

FIG. 8 shows various hardware components of the event initiation and management module (140d) included in the secure virtual event controller (140) according to various embodiments. The event initiation and management module (140d) includes a metaverse engine (802), a virtual event engine (804), metaverse APIs (806), dynamic control APIs (808) and an event schedule and control module (810).

The metaverse engine (802) is responsible for simulation creation and virtual environment definition and may contain a virtual space database (DB) and related resources. The metaverse engine (802) majorly interacts with the virtual event with the essential resources needed and requested by the virtual events.

The virtual event engine (804) is responsible for event scheduling in the metaverse and requesting and acquiring virtual event resources from the metaverse engine (802). The virtual event engine (804) handles an operation of event scheduling, virtual space management, simulation of the event, and/or event security and privacy management.

The metaverse APIs (806) provide access to the metaverse resources to which the virtual event is subscribed. The dynamic control APIs (808) provide access to the virtual event resources to which an attendee is subscribed and vice versa.

The virtual event includes the event scheduling and control module responsible for event actions. The simulation and rendering services, audio/video (AV) are considered as event resources. Along with the above, security service will be running by default for security incident management, control, and reporting, and the event feedback analytics will be responsible for providing policy improvement feedback. The security policies determined by the dynamic security control module and the control actions are applied while initiating the event and will be running as a service in the background. The policy application is triggered when appropriate events are triggered in the virtual event.

Although FIG. 8 shows various hardware components of the event initiation and management module (140*d*), it should be understood that other embodiments are not limited thereto. In various embodiments, the event initiation and management module (140*d*) may include fewer or more components. Further, the labels or names of the components are used only for illustrative purpose and do not limit the scope of the disclosure. One or more components can be combined together to perform same or substantially similar function in the event initiation and management module (140*d*).

Figure 9:
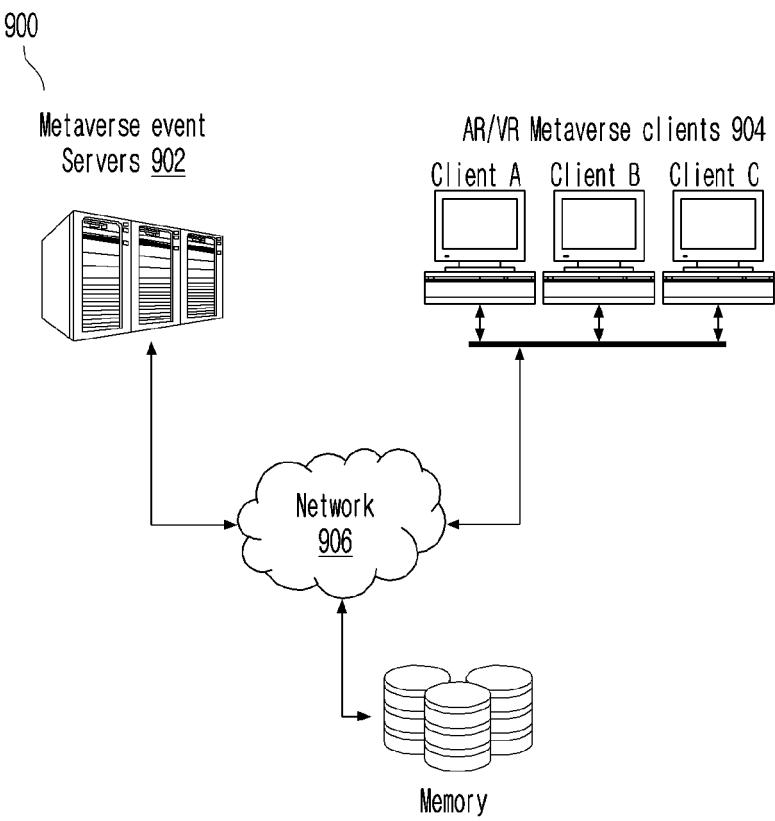
FIG. 9 shows an overview of an example system for handling an event initiation and management according to various embodiments.

FIG. 9 shows an overview of an example system (900) for handling an event initiation and management according to various embodiments. In an embodiment, the system (900) includes metaverse event servers (902), AR/VR metaverse clients (904) (e.g., electronic device (100) already explained in FIG. 4), and a network (906) (e.g., local area network (LAN), cellular network, Internet or other type of network). The metaverse event servers (902) communicate with the AR/VR metaverse clients (904) over the network (906). The AR/VR metaverse clients (904) manage an interface between a system user and the metaverse event servers (902). In an embodiment, the AR/VR metaverse clients (904) may be a desktop or laptop computer. In an embodiment, the AR/VR metaverse clients (904) may be a video game console. In various embodiments, the AR/VR metaverse clients (904) may be a mobile computing device that allows the user to connect to and interact with a metaverse.

The metaverse event servers (902) host a simulated virtual world, the metaverse, to the plurality of AR/VR metaverse clients (904). In an embodiment, the metaverse event servers (902) are an array of servers. In various embodiments, a specified area of the metaverse is simulated by a single server instance, and multiple server instances may be run on the metaverse event servers (902). In various embodiments, the metaverse event servers (902) include a plurality of simulation servers dedicated to a physics simulation in order to manage interactions and handle collisions between characters and objects in a metaverse. In various embodiments, the metaverse event servers (902) include a plurality of storage servers dedicated to storing data related to objects and characters in the metaverse world. The data stored in the plurality of storage servers may include object shapes, avatar shapes and appearances, audio clips, metaverse related scripts, and/or other metaverse related objects.

Figure 10:
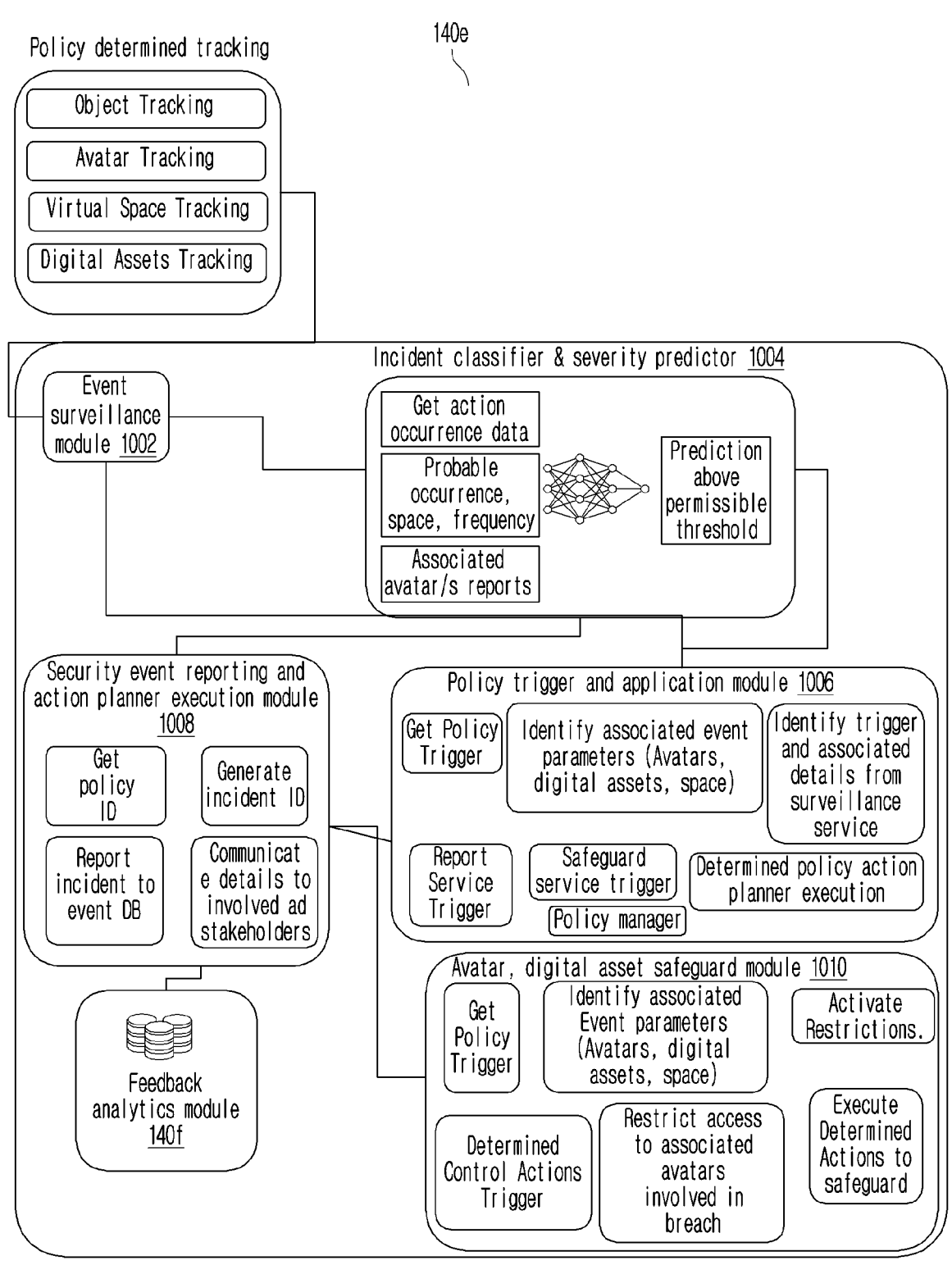
FIG. 10 shows various hardware components of an example event action control and feedback module included in the secure virtual event controller according to various embodiments.

FIG. 10 shows various hardware components of an example event action control and feedback module (140*e*) included in the secure virtual event controller (140) according to various embodiments. The event action control and feedback module (140*e*) includes an event surveillance module (1002), an incident classifier and severity predictor (1004), a policy trigger and application module (1006), a security event reporting and action planner execution module (1008), an avatar, digital asset safeguard module (1010), and a feedback analytics module (140*f*).

The event surveillance module (1002) performs policy based tracking on the virtual event. Such tracking may include tracking of objects like digital assets, avatar implied or explicit activities, virtual space tracking, etc. The incident classifier and severity predictor (1004) performs incident classification and predicts the severity of an incident. Activities of the incident classifier and severity predictor (1004) include collection of action occurrence data, probable action occurrence, frequency of incidents with the profile with the associated avatar as inputs to a DNN based model to predict the severity. If the prediction score is above a defined threshold, appropriate severity is assigned. Also a next action prediction to trigger policy action controls is made accordingly.

The policy trigger and application module (1006) performs policy trigger and control action application based on the trigger from the event action. Major actions include identifying the policy to be triggered, identifying the associated event parameters related to avatars, digital assets, virtual space, etc., and identifying the trigger and surveillance service data collection. This triggers the reporting service, safeguard avatar, assets service and also would trigger the associated determined policy action control planner execution. The security event reporting and action planner execution module (1008) reports the incident security as classified by the incident classifier and severity predictor module (1004) and is also responsible for reporting the policy breach and control actions applied. This module would report to respective stakeholders as appropriate.

The avatar, digital asset safeguard module (1010) is responsible for, on receiving the policy trigger, identifying the associated event parameters, access restrictions to the assets in the space, trigger determined control actions, restricting associated avatars which caused the breach, and executing determined actions as per the action planner for the policy identified. The feedback analytics module (140*f*) is responsible for collecting incident data, nature of breach, severity reported, frequency of the avatars repeating, actions executed as per the action planner, and state of the assets in the space on security breach, etc., as feedback analytics to improve the policy or to generate new policy.

Although FIG. 10 shows various hardware components of the event action control and feedback module (140*e*), it should be understood that other embodiments are not limited thereto. In various embodiments, the event action control and feedback module (140*e*) may include fewer or more components. Further, the labels or names of the components are used only for illustrative purpose and do not limit the scope of the disclosure. One or more components can be combined together to perform same or substantially similar function in the event action control and feedback module (140*e*).

FIG. 11 is a flow chart (1100) illustrating an example method for handling the secure virtual event in the virtual environment according to various embodiments. The operations (S1102, S1104, S1106, and S1108) are handled, for example, by the secure virtual event controller (140).

At S1102, the method includes receiving at least one input from a first user avatar to create at least one virtual event within a virtual environment. At S1104, the method includes identifying at least one second user avatar for participating the at least one created virtual event based on the received input from the first user avatar and a nature of the virtual event.

At S1106, the method includes determining the at least one security policy corresponding to at least one action associated with the at least one second user avatar and at least one parameter within the at least one created virtual event. At S1108, the method includes applying the at least one determined security policy to the at least one created virtual event upon triggering of the at least one created virtual event in the virtual environment.

Figure 12:
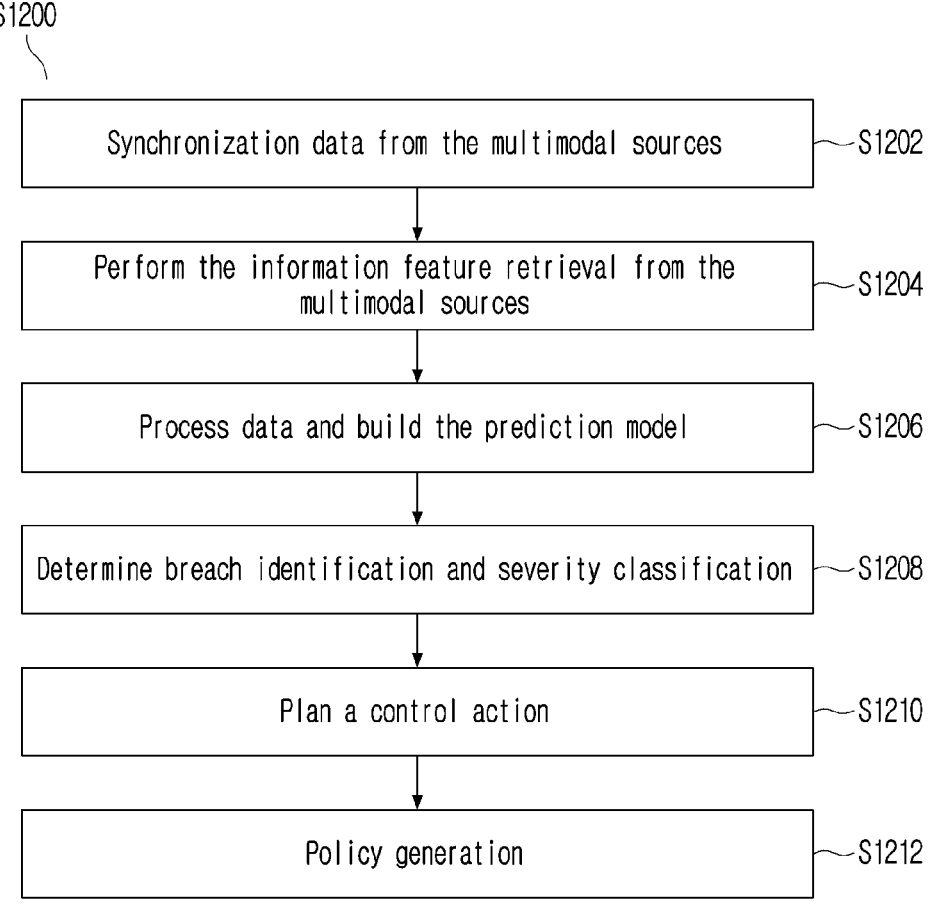
FIG. 12 is a flow chart illustrating an example policy generation operation in conjunction with FIG. 11 according to various embodiments.

FIG. 12 is a flow chart (1200) illustrating an example policy generation operation, in conjunction with FIG. 11, according to various embodiments. The operations (S1202, S1204, S1206, S1208, S1210, and S1212) are handled, for example, by the secure virtual event controller (140).

At S1202, the method includes receiving synchronization data from the multimodal sources. At S1204, the method includes performing the information feature retrieval from the multimodal sources. At S1206, the method includes processing the data and building a prediction model. At S1208, the method includes determining breach identification and severity classification. At S1210, the method includes planning a control action. At S1212, the method includes performing policy generation.

Figure 13:
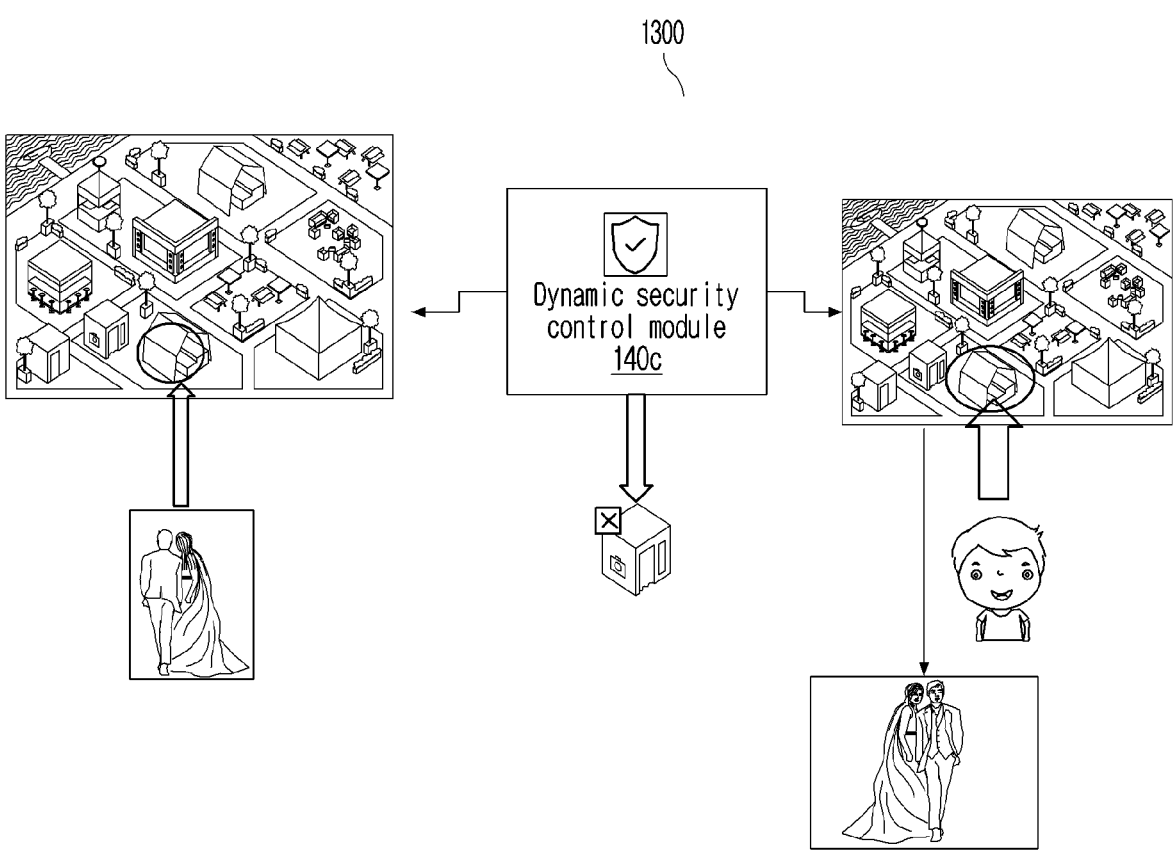
FIG. 13 is an example illustration in which an example electronic device handles a secure virtual event in the virtual environment during a privacy breach avoidance scenario according to various embodiments.

FIG. 13 is an example illustration (1300) in which an example electronic device (100) handles a secure virtual event in a virtual environment during a privacy breach avoidance scenario according to various embodiments.

As shown in FIG. 13, consider a scenario in which a couple enters a photo booth and spends private moments to take pictures. Based on the proposed method, the dynamic security control module (140c) detects the privacy policy for photo booth and the electronic device (100) locks the photo booth from entry for any other avatars. Meanwhile, while the couple is inside the photo booth, a child avatar may attempt to enter into the photo booth. Because the photo booth is secured with a privacy policy, when the couple enters into the booth, a status of booth is changed to occupied and further entries are blocked, thereby creating a safe and secure environment. An incident may be reported for any actions. The couple spends private moments to take pictures and there is no privacy breach.

Figure 14:
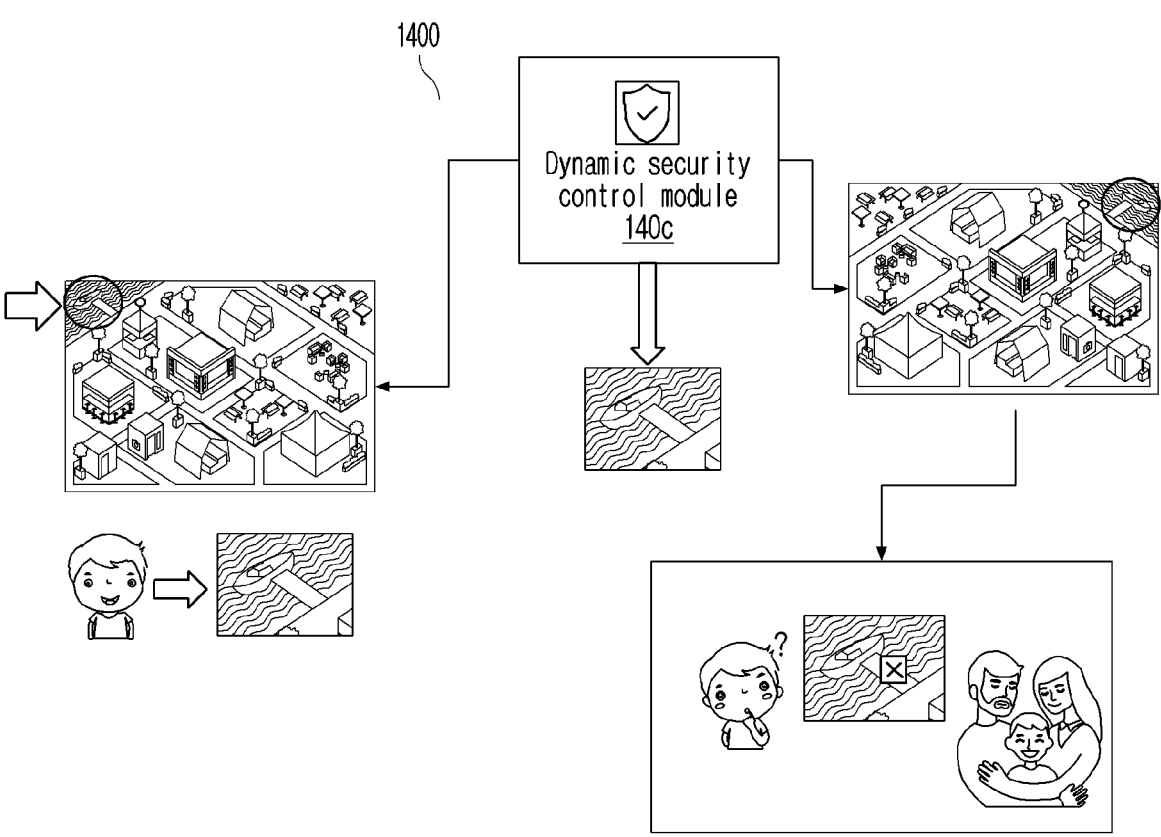
FIG. 14 is an example illustration in which an example electronic device handles a secure virtual event in the virtual environment during a space access restriction scenario according to various embodiments.

FIG. 14 is an example illustration (1400) in which an example electronic device (100) handles a secure virtual event in a virtual environment during a space access restriction scenario according to various embodiments.

As shown in FIG. 14, Johnny, a child, tries to enter a boating space. Based on the proposed method, the dynamic security control module (140c) detects that a security policy for the boating space: NoKidZone and Kids Not allowed without guardian company. Further, the electronic device (100) locks the boating space for Johnny. Because the electronic device (100) has a dynamic security control module (140c) in place, the boating space is secured with the policies. Johnny, the child, is blocked from entering into the boating space and the boating space is secured. An incident may be reported to guardians and stakeholders for any actions.

Figure 15:
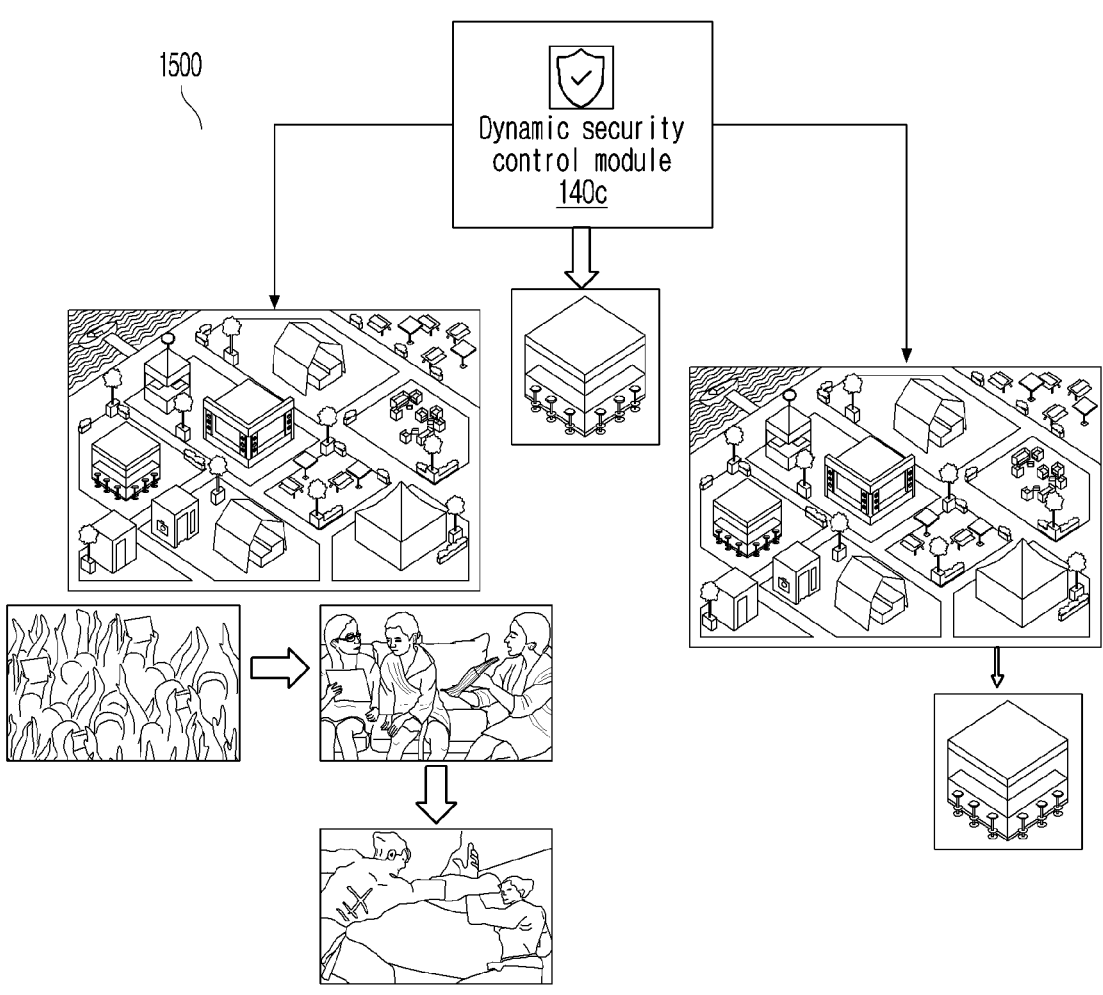
FIG. 15 is an example illustration in which an example electronic device handles a secure virtual event in the virtual environment during an unpleasant activity scenario according to various embodiments.

FIG. 15 is an example illustration (1500) in which an example electronic device (100) handles a secure virtual event in a virtual environment during an unpleasant activity scenario according to various embodiments.

As shown in FIG. 15, consider a scenario in which a mass of young avatars, placed at a drinking area, are enjoying a party. An act of an avatar triggers heated arguments and avatars are divided into groups. Predictably, the next act may be a fight. A drinking area is a restricted area as well as a sensitive area according to the policy. Based on the proposed method, the dynamic security control module (140c) detects the situation and triggers the security Policy: sensitiveArea, heated arguments, fights, sensitive activities are restricted in this area. Hence, the electronic device (100) blocks the NFTs at the drinking area. Further, the electronic device (100) identifies and detains avatars involved in the brawl. The avatars are blacklisted and give a negative rating to discourage repeated behaviour of this kind. The dynamic security control module (140c) identifies activities and triggers policies to safeguard the NFTs and detains the quarrelling avatars, thereby avoiding an unpleasant situation. Thus, the birthday party is continued with no blocking.

Figure 16:
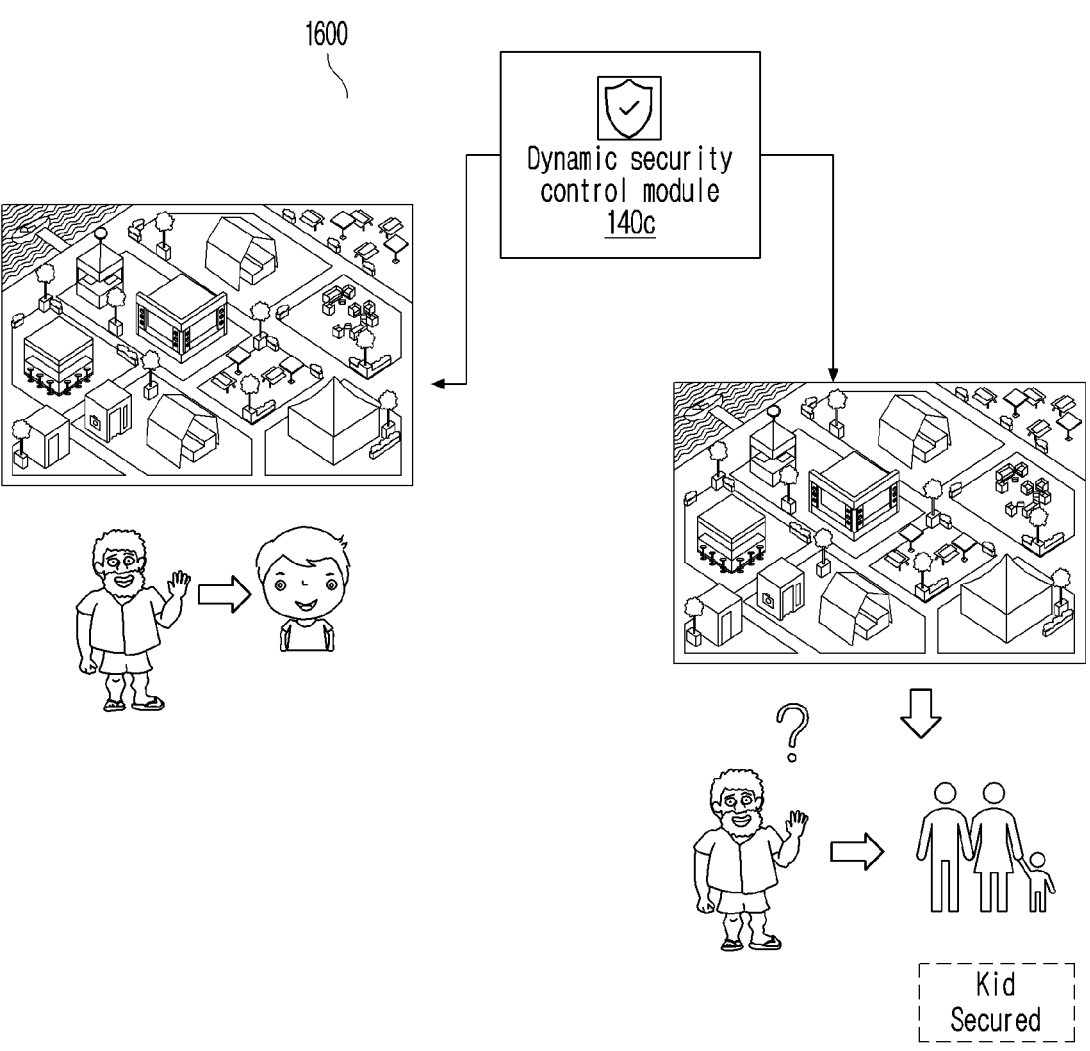
FIG. 16 is an example illustration in which an example electronic device handles a secure virtual event in the virtual environment during a random avatar interaction scenario according to various embodiments.

FIG. 16 is an example illustration (1600) in which an example electronic device (100) handles a secure virtual event in a virtual environment during a random avatar interaction scenario according to various embodiments.

As shown in FIG. 16, consider a scenario in which a random person tries to communicate with Johny, the child, in a networking space. Johny tries to avoid the communication by moving away. But the random person avatar still follows Johny. Based on the proposed methods, the dynamic security control module (140c) detects the security policy: watchTheKid, Random avatar communicating with or following the Kids while the kid is trying to avoid. Such a behaviour is not allowed without guardian company. Thus, the electronic device (100) performs the defined policy and hides Johny from the Random avatar. Johny will not be visible to the Random avatar until one of the guardians is present as a safeguard. Also, this incident/SOS is reported to guardians and stakeholders for any actions.

Figure 17:
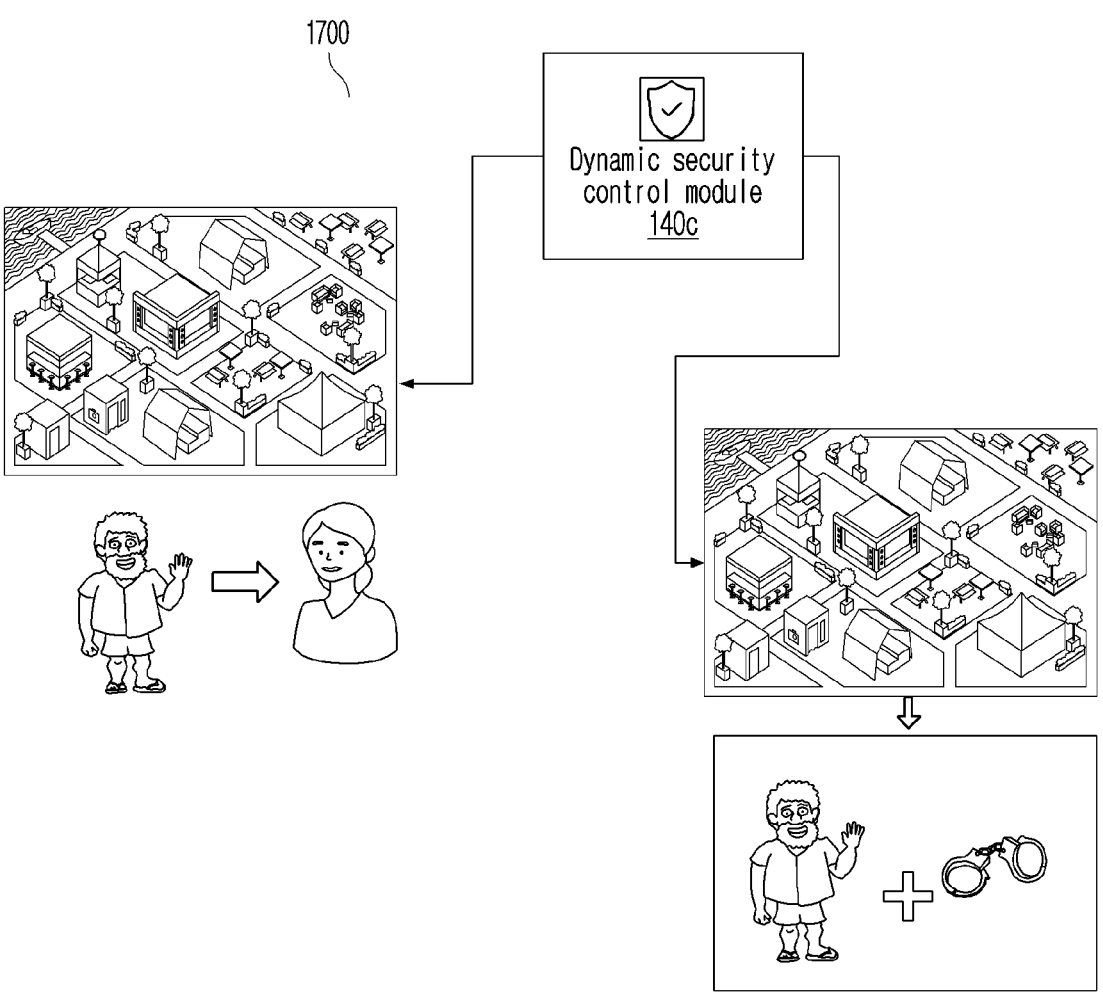
FIG. 17 is an example illustration in which an example electronic device handles a secure virtual event in the virtual environment during a misbehaviour scenario according to various embodiments.

FIG. 17 is an example illustration (1700) in which an example electronic device (100) handles a secure virtual event in a virtual environment during a misbehaviour scenario according to various embodiments.

As shown in FIG. 17, consider a scenario in which Robert, a friend of Mary, is in conversation with Mary, in a birthday event. Mary somehow observes that Robert's activities during the conversation are not appropriate. Based on the proposed method, the dynamic security control module (140c) detects the security policy such as misbehaviour for any avatar misbehaving with any other avatar. Moreover, such behaviour is not allowed in the event in any case. Policy will be auto triggered or by gesture or distress signals from Mary. Hence, the electronic device (100) performs the defined policy, and Robert will be auto detained and reported and suspending from the event until a review is conducted. Moreover, to discourage such events, Robert will be blacklisted/negatively rated for further events. Also, the incident is reported and stakeholders informed for any further actions.

Figure 18:
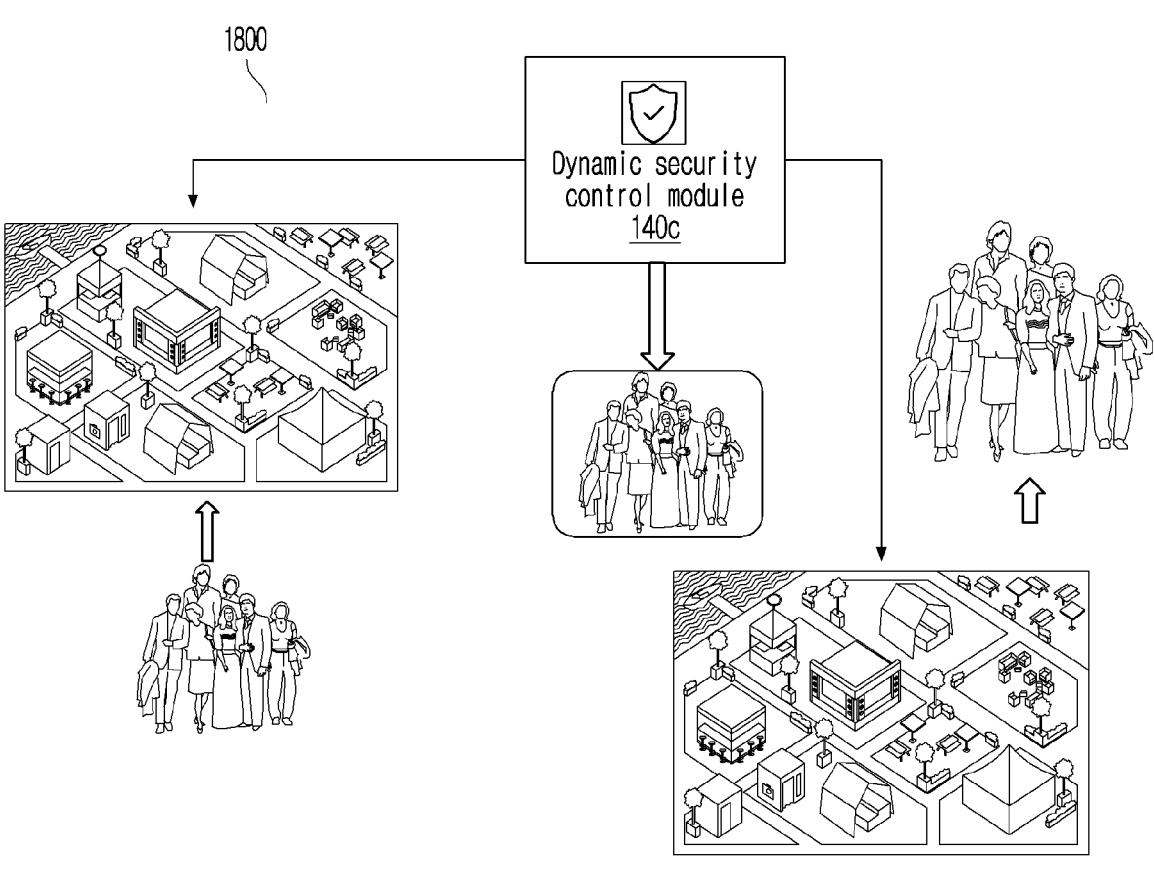
FIG. 18 is an example illustration in which an example electronic device handles a secure virtual event in the virtual environment during a sub-event creation scenario according to various embodiments.

FIG. 18 is an example illustration (1800) in which an example electronic device (100) handles a secure virtual event in a virtual environment during a sub-event creation scenario according to various embodiments.

As shown in FIG. 18, Aron, is meeting with his long time buddies in a birthday event. Aron requests the host to allow him to host sub event. The host allows Aron to host a sub-event with certain limitations, e.g., 15 minutes sub-event, one-time event, maximum of 5 avatars. Based on the proposed method, the dynamic security control module (140c) is in place, and the private sub-event is secured with all main event policies and specific sub-event policies. Aron can hold this event as per the policies. This sub-event is hidden from main event attendees, and hence there are no disturbances. The policies provide a safe and secure environment and any incident can be reported for any further actions.

Figure 19:
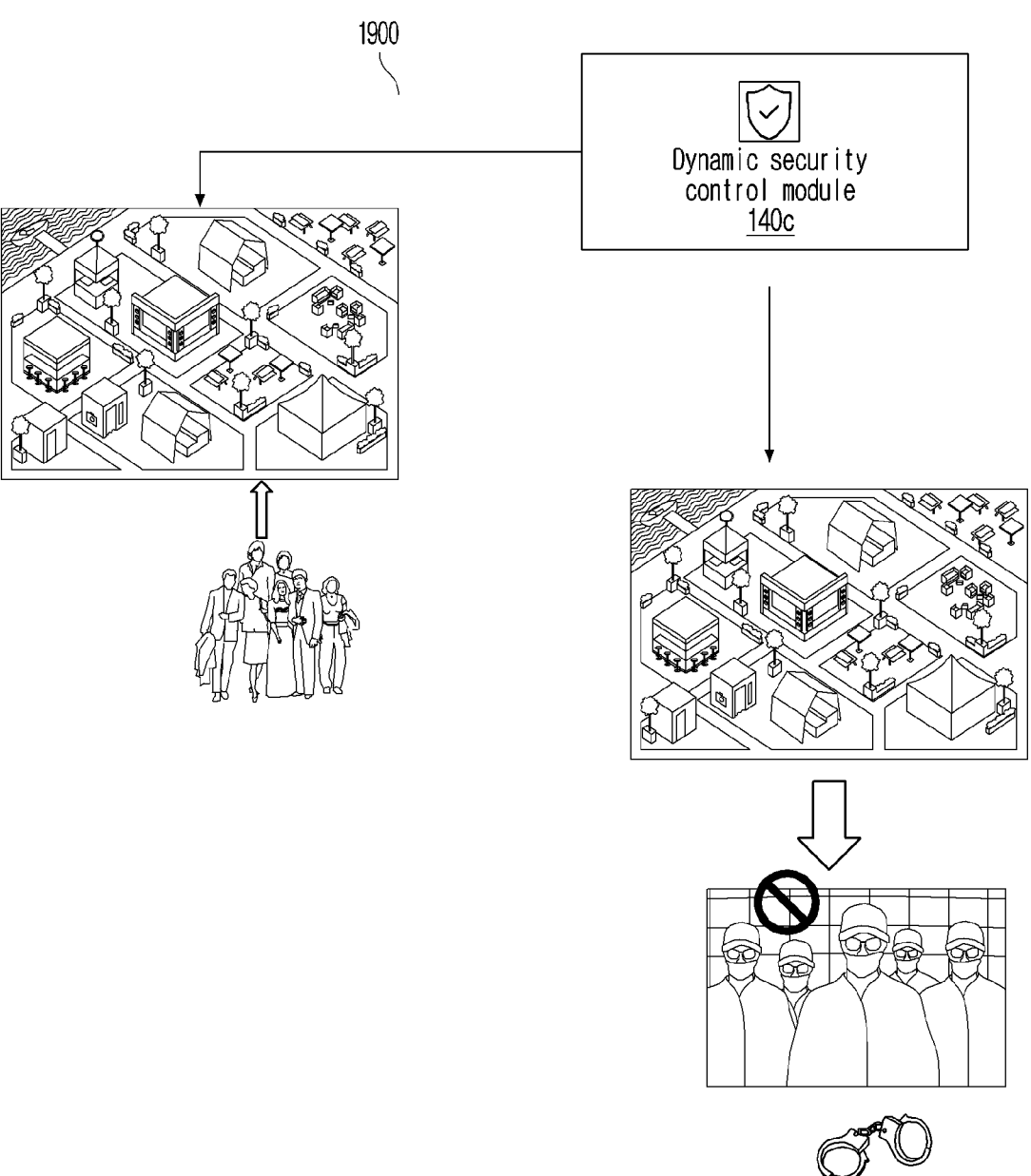
FIG. 19 is an example illustration in which an example electronic device handles a secure virtual event in the virtual environment during a harmful sub-event creation scenario according to various embodiments.

FIG. 19 is an example illustration (1900) in which an example electronic device (100) handles a secure virtual event in a virtual environment during a harmful sub-event creation scenario according to various embodiments.

As shown in FIG. 19, Norman requests a host to conduct a private sub-event in a birthday event. The host allows Norman to host a sub-event with certain limitations, e.g., 15 minutes sub-event, one-time event, maximum of 5 avatars. The dynamic security control module (140c) detects the security Policy: harmfulSubEvent, any avatar involved in harmful activities with any other avatar or event. Such activities are not allowed in the event in any case and the policy will be auto triggered. Hence, the electronic device (100) performs the defined policy and Norman and his group will be auto detained and reported and suspending from the event pending review. In order to discourage such events, Robert will be blacklisted/negatively rated for further events.

Figure 20:
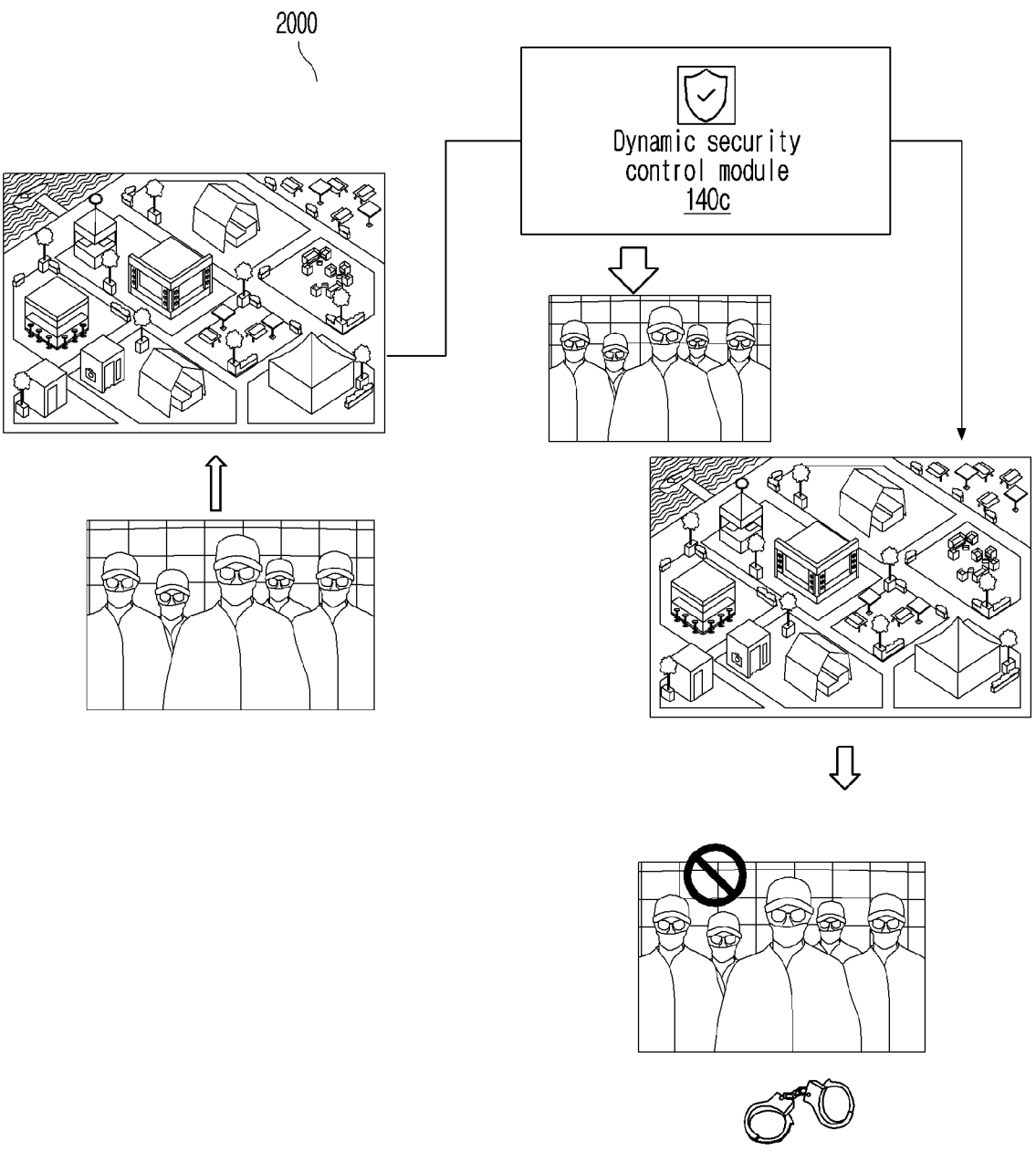
FIG. 20 is an example illustration in which an example electronic device handles a secure virtual event in the virtual environment during a harmful content circulation scenario according to various embodiments.

FIG. 20 is an example illustration (2000) in which an example electronic device (100) handles a secure virtual event in a virtual environment during a harmful content circulation scenario according to various embodiments.

As shown in FIG. 20, it appears that Kaylie is floating a malicious code in the virtual environment to attack the electronic device (100). Based on the proposed method, the dynamic security control module (140c) detects the security Policy: harmfulContentCirculation, any avatar involved in harmful activities along with any other avatar. Such activities are not allowed in the event in any case and the policy will be auto triggered. The electronic device (100) performs the defined policy and Kaylie alone and/or her group will be auto detained and reported for suspending from the event pending review. In order to discourage such events, Kaylie will be blacklisted/negatively rated for further events.

FIG. 21 is an example illustration (2100) in which an example electronic device (100) handles a secure virtual event in a virtual environment during a secure private sub-event within an event scenario according to various embodiments.

As shown in FIG. 21, the users attending an event in a virtual environment need to attend to personal needs such as making a payment, or answering an incoming call, or discussing privately with the co-attendees. An event host with Admin privileges provides privileges to the attendees with which attendee will be able to create a small secure private sub-event inside the event. Privacy of user actions in the private sub-event is ensured by enforcement of dynamic policies on detecting actions qualifying for the private sub-event. The user may even be provided options to opt-out of private secure sub event in case involvement of other avatars is needed. For example, phone call put on speaker mode so that nearby avatar also could hear conversation.

The various actions, acts, blocks, steps, or the like in the flow charts (1100 and 1200) may be performed in the order presented, in a different order, or simultaneously. Further, in various embodiments, some of the actions, acts, blocks, steps, or the like may be omitted, added, modified, skipped, or the like without departing from the scope of the disclosure.

The example embodiments disclosed herein can be implemented through at least one software program running on at least one hardware device and performing network management functions to control the elements.

The foregoing description of specific example embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for handling a secure virtual event in a virtual environment, the method comprising:
   receiving, by an electronic device, at least one input from a first user avatar to create at least one virtual event within the virtual environment;
   identifying, by the electronic device, at least one second user avatar for participating in the at least one created virtual event based on the received input from the first user avatar and a nature of the virtual event; and
   determining, by the electronic device, at least one security policy corresponding to at least one action associated with the at least one second user avatar and at least one parameter within the at least one created virtual event, wherein the method further comprises:
   determining, by the electronic device, a policy breach corresponding to the at least one created virtual event in the virtual environment;
   analyzing, by the electronic device, the policy breach;
   providing, by the electronic device, a suggestion to update the at least one security policy; and
   applying, by the electronic device, the at least one updated security policy to the at least one created virtual event upon triggering of the at least one created virtual event in the virtual environment.

2. The method as claimed in claim 1, further comprising:
   applying, by the electronic device, the at least one determined security policy to the at least one created virtual event upon triggering of the at least one created virtual event in the virtual environment.

3. The method as claimed in claim 2, further comprising:
   monitoring, by the electronic device, the at least one security policy to generate at least one feedback over a period of time using a data driven model; and
   modifying, by the electronic device, the at least one security policy based on the at least one feedback.

4. The method as claimed in claim 2, further comprising:
   determining, by the electronic device, the policy breach corresponding to the at least one created virtual event in the virtual environment; and
   analyzing, by the electronic device, the policy breach to block and report the policy breach in the virtual environment.

5. The method as claimed in claim 1, wherein information associated with the policy breach comprises at least one of a profile history of the at least one second user avatar, a past event hosted by the at least one second user avatar, a past event attended by the at least one second user avatar, an incident reported on profiles in past events, recurrence of security event reports, a profile history of the first user avatar, a past event hosted by the first user avatar, a past event attended by the first user avatar, incidents reported profiles in the past events, behavioral patterns and sensitive information regarding privacy and security of virtual space included in the virtual event, event surveillance data log, event specific incidents observed based on event type and spaces, historical data on the virtual space and incidents reported, or possible security breach data points.

6. The method as claimed in claim 2, further comprising:

assigning, by the electronic device, an admin privilege to the at least one second user avatar for creating at least one sub-virtual event in the virtual environment; and performing, by the electronic device, at least one of:

allowing the at least one sub-virtual event in response to determining that a privacy of user action in the at least one sub-virtual event is met in the virtual environment, or denying the at least one sub-virtual event in response to determining that the privacy of user action in the at least one sub-virtual event is not met in the virtual environment.

7. The method as claimed in claim 1, wherein the at least one security policy for the at least one created virtual event is generated by correlating at least one of security activity patterns, past behaviors associated with the at least one second user avatar, user profiles associated with the at least one second user avatar, past behaviors associated with the first user avatar, user profiles associated with the first user avatar, information associated with the at least one virtual event, or virtual location.

8. The method as claimed in claim 1, wherein determining, by the electronic device, the at least one security policy comprises:

acquiring at least one of security breach reports and measures data, details of the virtual event, profiles associated with the first user avatar, or profiles associated with the at least one second user avatar;

processing the at least one of the security breach reports and measures data, the details of the virtual event, the profiles associated with the first user avatar, or the profiles associated with the at least one second user avatar using a data driven model; and determining, by the electronic device, the at least one security policy based on the processing.

9. The method as claimed in claim 1, wherein the at least one parameter comprises a virtual location, event information, space restriction, and time related information, and wherein the at least one input comprises at least one of virtual event information, virtual location information, or a list comprising the at least one second user avatar.

10. The method as claimed in claim 1, wherein the at least one virtual event is created by:

determining information associated with the first user avatar and information associated with the at least one second user avatar, wherein the information comprises at least one of privacy, age group, a location, or time;

extracting a nature of the virtual event; and creating the at least one virtual event based on the information associated with the first user avatar and information associated with the at least one second user avatar and the nature of the virtual event.

11. The method as claimed in claim 1, wherein the at least one second user avatar for participating in the at least one created virtual event is identified by:

authorizing and sending an event invite message to the at least one second user avatar from the first user avatar;

receiving an event acceptance message from the at least one second user avatar to the first user avatar; and initiating the event with controllable privacy settings with the at least one second user avatar based on the event acceptance message.

12. An electronic device for handling a secure virtual event in a virtual environment, the electronic device comprising:

a processor comprising processing circuitry;

memory; and a secure virtual event controller, coupled with the processor and the memory, configured to:

receive at least one input from a first user avatar to create at least one virtual event within the virtual environment;

identify at least one second user avatar for participating in the at least one created virtual event based on the received input from the first user avatar and a nature of the virtual event; and determine at least one security policy corresponding to at least one action associated with the at least one second user avatar and at least one parameter within the at least one created virtual event, wherein the secure virtual event controller is further configured to:

determine a policy breach corresponding to the at least one created virtual event in the virtual environment;

analyze the policy breach;

provide a suggestion to update the at least one security policy; and apply the at least one updated security policy to the at least one created virtual event upon triggering of the at least one created virtual event in the virtual environment.

13. The electronic device as claimed in claim 12, wherein the secure virtual event controller is configured to apply the at least one determined security policy to the at least one created virtual event upon triggering of the at least one created virtual event in the virtual environment.

14. The electronic device as claimed in claim 13, wherein the secure virtual event controller is configured to:

monitor the at least one security policy to generate at least one feedback over a period of time using a data driven model; and modify the at least one security policy based on the at least one feedback.

15. The electronic device as claimed in claim 13, wherein the secure virtual event controller is configured to:

determine the policy breach corresponding to the at least one created virtual event in the virtual environment; and analyze the policy breach to block and report the policy breach in the virtual environment.

16. The electronic device as claimed in claim 12, wherein information associated with the policy breach comprises at least one of a profile history of the at least one second user avatar, a past event hosted by the at least one second user avatar, a past event attended by at least one second user avatar, an incident reported on profiles in past events, recurrence of security event reports, a profile history of the first user avatar, a past event hosted by the first user avatar, a past event attended by the first user avatar, incidents reported on profiles in the past events, behavioral patterns and sensitive information regarding a privacy and security of virtual space included in the virtual event, event surveillance data log, event specific incidents observed based on event type and spaces, historical data on the virtual space and incidents reported, or possible security breach data points.

17. The electronic device as claimed in claim 13, wherein the secure virtual event controller is configured to:

assign an admin privilege to the at least one second user avatar for creating at least one sub-virtual event in the virtual environment; and perform at least one of:

allow the at least one sub-virtual event in response to determining that a privacy of user action in the at least one sub-virtual event is met in the virtual environment, or deny at least one sub-virtual event in response to determining that the privacy of user action in the at least one sub-virtual event is not met in the virtual environment.

18. The electronic device as claimed in claim 12, wherein the at least one security policy for the at least one created virtual event is generated by correlating at least one of security activity patterns, past behaviors associated with the at least one second user avatar, user profiles associated with the at least one second user avatar, past behaviors associated with the first user avatar, user profiles associated with the first user avatar, information associated with the at least one virtual event, or virtual location.

\* \* \* \* \*